US012609349B2

(12) United States Patent
Suzuki et al.

(10) Patent No.: US 12,609,349 B2
(45) **Date of Patent: *Apr. 21, 2026**

(54) SOLID ELECTROLYTE AND SOLID ELECTROLYTE BATTERY

(71) Applicant: TDK CORPORATION, Tokyo (JP)

(72) Inventors: Hisashi Suzuki, Tokyo (JP); Tetsuya Ueno, Tokyo (JP)

(73) Assignee: TDK Corporation, Tokyo (JP)

( * ) Notice: Subject to any disclaimer, the term of this patent is extended or adjusted under 35 U.S.C. 154(b) by 601 days.

This patent is subject to a terminal disclaimer.

(21) Appl. No.: 18/011,684

(22) PCT Filed: Jun. 24, 2021

(86) PCT No.: PCT/JP2021/023957

§ 371 (c)(1),
(2) Date: Dec. 20, 2022

(87) PCT Pub. No.: WO2021/261558

PCT Pub. Date: Dec. 30, 2021

(65) Prior Publication Data

US 2023/0253614 A1 Aug. 10, 2023

(30) Foreign Application Priority Data

Jun. 24, 2020 (JP) ................................ 2020-108610

(51) Int. Cl.
*H01M 10/0562* (2010.01)

(52) U.S. Cl.
CPC .. *H01M 10/0562* (2013.01); *H01M 2300/008* (2013.01)

(58) Field of Classification Search
None
See application file for complete search history.

(56) References Cited

U.S. PATENT DOCUMENTS 5,961,950 A 10/1999 Dahn et al.
10,601,073 B2 3/2020 Yoshioka et al.
(Continued)

FOREIGN PATENT DOCUMENTS

CN 102017269 A 4/2011
CN 107925127 A 4/2018
(Continued)

OTHER PUBLICATIONS

Sep. 7, 2021 International Search Report issued in International Patent Application No. PCT/JP2021/023957.
(Continued)

*Primary Examiner* — Kevin M Bernatz
(74) *Attorney, Agent, or Firm* — Oliff PLC

(57) ABSTRACT

A solid electrolyte is composed of a compound represented by the following formula. $A_aE_bG_cX_d$ (A is at least one element selected from Li and Cs. E is at least one element selected from the group consisting of Al, Sc, Y, Zr, Hf and lanthanoids. G is at least one group selected from the group consisting of OH, $BO_2$, $BO_3$, $BO_4$, $B_3O_6$, $B_4O_7$, $CO_3$, $NO_3$, $AlO_2$, $SiO_3$, $SiO_4$, $Si_2O_7$, $Si_3O_9$, $Si_4O_{11}$, $Si_6O_{18}$, $PO_3$, $PO_4$, $P_2O_7$, $P_3O_{10}$, $SO_3$, $SO_4$, $SO_5$, $S_2O_3$, $S_2O_4$, $S_2O_5$, $S_2O_6$, $S_2O_7$, $S_2O_8$, $BF_4$, $PF_6$ and BOB. X is at least one element selected from the group consisting of F, Cl, Br and I. $0.5 \leq a < 6$, $0 < b < 2$, $0.1 < c \leq 6$ and $0 \leq d \leq 6.1$).

2 Claims, 5 Drawing Sheets

(56) References Cited

U.S. PATENT DOCUMENTS

| | | | |
|---|---|---|---|
| 2012/0308900 A1 | 12/2012 | Ogasa | |
| 2014/0162136 A1 | 6/2014 | Kang et al. | |
| 2015/0333366 A1 | 11/2015 | Sato et al. | |
| 2015/0364787 A1 | 12/2015 | Zhang et al. | |
| 2016/0268630 A1* | 9/2016 | Tsukada | H01M 10/0562 |
| 2019/0088995 A1 | 3/2019 | Asano et al. | |
| 2019/0190057 A1 | 6/2019 | Nozue et al. | |
| 2019/0252720 A1* | 8/2019 | Sato | H01M 4/136 |
| 2020/0020976 A1* | 1/2020 | Isomichi | H01M 10/0525 |
| 2020/0083563 A1 | 3/2020 | Kawamura et al. | |
| 2020/0136217 A1 | 4/2020 | Kwon et al. | |
| 2020/0266445 A1* | 8/2020 | Tsukada | H01M 10/0525 |
| 2021/0028444 A1 | 1/2021 | Laine et al. | |
| 2021/0184244 A1 | 6/2021 | Taniuchi et al. | |
| 2021/0194046 A1 | 6/2021 | Nam et al. | |
| 2022/0294010 A1* | 9/2022 | Isomichi | H01M 4/62 |
| 2023/0025424 A1* | 1/2023 | Tanaka | H01B 1/08 |
| 2023/0046253 A1 | 2/2023 | Tanaka et al. | |
| 2023/0094818 A1 | 3/2023 | Oshima et al. | |
| 2024/0120524 A1* | 4/2024 | Ueno | H01M 10/052 |
| 2024/0162480 A1* | 5/2024 | Kato | C01B 25/14 |
| 2024/0313259 A1* | 9/2024 | Masuko | H01M 10/052 |
| 2024/0413385 A1* | 12/2024 | Ueno | H01B 1/06 |
| 2025/0038174 A1* | 1/2025 | Suzuki | H01M 4/36 |
| 2025/0167296 A1* | 5/2025 | Sato | H01M 10/0562 |
| 2025/0183360 A1* | 6/2025 | Kurihara | H01B 1/08 |

FOREIGN PATENT DOCUMENTS

| | | |
|---|---|---|
| CN | 108258305 A | 7/2018 |
| CN | 108365260 A | 8/2018 |
| CN | 109075389 A | 12/2018 |
| CN | 109428116 A | 3/2019 |
| CN | 110380114 A | 10/2019 |
| CN | 110635164 A | 12/2019 |
| CN | 111509222 A | 8/2020 |
| EP | 3 496 202 A1 | 6/2019 |
| JP | H06-80462 A | 3/1994 |
| JP | H06-349494 A | 12/1994 |
| JP | 2001-143754 A | 5/2001 |
| JP | 2004-146071 A | 5/2004 |
| JP | 2006-244734 A | 9/2006 |
| JP | 2012-089424 A | 5/2012 |
| JP | 2012-246196 A | 12/2012 |
| JP | 2013-257992 A | 12/2013 |
| JP | 2015-065021 A | 4/2015 |
| JP | 2015-065022 A | 4/2015 |
| JP | 2016-001595 A | 1/2016 |
| JP | 2016-018679 A | 2/2016 |
| JP | 2017-011068 A | 1/2017 |
| JP | 2017-079126 A | 4/2017 |
| JP | 2019-067511 A | 4/2019 |
| JP | 2019-091583 A | 6/2019 |
| JP | 2021-096950 A | 6/2021 |
| JP | 2021150055 A | 9/2021 |
| JP | 2023-060591 A | 4/2023 |
| KR | 98-0012682 A | 4/1998 |
| WO | 2012043566 A1 | 4/2012 |
| WO | 2013/100000 A1 | 7/2013 |
| WO | 2017/126682 A1 | 7/2017 |
| WO | 2017154922 A1 | 9/2017 |
| WO | 2018/025582 A1 | 2/2018 |
| WO | WO-2018181578 A1 * | 10/2018 ........ H01M 10/0562 |
| WO | 2019/098613 A1 | 5/2019 |
| WO | 2020/070955 A1 | 4/2020 |
| WO | 2021/261361 A1 | 12/2021 |

OTHER PUBLICATIONS

Nov. 10, 2020 International Search Report issued in International Patent Application No. PCT/JP2020/032895.

Translation of Jun. 12, 2023 Office Action issued in CN Patent Application No. 202080063557.3.

Translation of Nov. 8, 2023 Office Action issued in CN Patent Application No. 202080063557.3.

English Translation of the Apr. 1, 2024 Office Action issued in Chinese Patent Application No. 202080063557.3.

Nov. 26, 2024 Non-Final Rejection received in U.S. Appl. No. 17/641,531.

Davaasuren et al. Impact of sintering temperature on phase formation, microstructure, crystallinity and ionic conductivity of Li1.5Al0.5Ti1.5(PO4)3, Solid State Ionics, vol. 338, 144-152 (2019) (Year: 2019).

Bykov et al., Multivalent ionic conductivity in the series of phosphates LaxYb1/3-xZr2(PO4)3 with NASICON structure, Solid State Ionics, vol. 182, 47-52 (2011) (Year: 2011).

Isomichi et al.; U.S. Appl. No. 17/641,531, filed Mar. 9, 2022.

Apr. 26, 2022 Search Report issued in International Patent Application No. PCT/JP2022/008644.

Apr. 19, 2022 International Search Report issued in International Patent Application No. PCT/JP2022/005392.

Translation of May 21, 2024 Office Action issued in Chinese Patent Application No. 202280014172.7.

Translation of Feb. 25, 2025 Office Action issued in Japanese Patent Application No. 2021-020431.

Mar. 15, 2022 International Search Report issued in International Patent Application No. PCT/JP2022/001265.

Jan. 10, 2023 Search Report issued in International Patent Application No. PCT/JP2022/043340.

Liang, Jianwen et al. "Site-Occupation-Tuned Superionic LixScCl3+xHalide Solid Electrolytes for All-Solid-State Batteries." Journal of the American Chemical Society. vol. 142, pp. 7012-7022, 2020.

May 23, 2023, International Search Report issued in International Patent Application No. PCT/JP2023/009673.

Kurihara et al.; U.S. Appl. No. 18/846,057, filed Sep. 11, 2024.

Suzuki et al.; U.S. Appl. No. 18/716,716, filed Jun. 5, 2024.

Ueno et al.; U.S. Appl. No. 18/272,458, filed Jul. 14, 2023.

Masuko et al.; U.S. Appl. No. 18/272,504, filed Jul. 14, 2023.

Ueno et al.; U.S. Appl. No. 18/276,319, filed Aug. 8, 2023.

Tanaka; U.S. Appl. No. 17/785,456, filed Jun. 15, 2022.

Mar. 2, 2026 Office Action issued in U.S. Appl. No. 18/272,504.

Mohammed Isah Kimpa et al.; Physical characterization and electrical conductivity of Li1.2Ti1.8AI0.2(PO4)3 and Li1.2Ta0.9AI1.1(PO4)3 NASICON material; International Journal of Integrated Engineering, vol. 10 No. 9 (2018) p. 108; DOI: <https://doi.org/10.30880/ijie.2018.10.09.020;> 2018.

CRC Handbook of Chemistry and Physics 106th Edition, CRC Press, Section: 4 | Document: Physical Constants of Inorganic Compounds, row 622; 2025.

Translation of Feb. 11, 2026 Office Action issued in Chinese Patent Application No. 202180044530.4.

English Machine Translation of CN 111900462 A.

* cited by examiner

SOLID ELECTROLYTE AND SOLID ELECTROLYTE BATTERY

TECHNICAL FIELD

The present invention relates to a solid electrolyte and a solid electrolyte battery.

Priority is claimed on Japanese Patent Application No. 2020-108610, filed in Japan on Jun. 24, 2020, the content of which is incorporated herein by reference.

BACKGROUND ART

In recent years, electronics technology has been significantly developed, and the size reduction, weight reduction, thickness reduction and multi-functionalization of mobile electronic devices have been achieved. Accordingly, for batteries that serve as power sources of electronic devices, there has been a strong demand for size reduction, weight reduction, thickness reduction and reliability improvement. Therefore, solid electrolyte batteries in which a solid electrolyte is used as an electrolyte are gaining attention. As the solid electrolyte, oxide-based solid electrolytes, sulfide-based solid electrolytes, complex hydride-based solid electrolytes ($LiBH_4$ and the like) and the like are known.

Patent Document 1 discloses a solid electrolyte secondary battery having a positive electrode including a positive electrode layer containing a positive electrode active material containing a Li element and a positive electrode current collector, a negative electrode including a negative electrode layer containing a negative electrode active material and a negative electrode current collector and a solid electrolyte that is sandwiched between the positive electrode layer and the negative electrode layer and is composed of a compound represented by the following general formula. Patent Document 1 discloses the solid electrolyte secondary battery in which the potential of the negative electrode active material with respect to Li is 0.7 V or lower on an average.

$$Li_{3-2X}M_XIn_{1-Y}M'_YL_{6-Z}L'_Z$$

(In the formula, M and M' are a metal element and L and L' are a halogen element. In addition, X, Y and Z independently satisfy $0 \le X \le 1.5$, $0 \le Y < 1$ and $0 \le Z \le 6$.)

Patent Document 2 discloses a solid electrolyte material represented by the following composition formula (1).

$$Li_{6-3Z}Y_ZX_6 \quad \text{Formula (1)}$$

Here, $0<Z<2$ is satisfied, and X is Cl or Br.

CITATION LIST

Patent Document

[Patent Document 1]

Japanese Unexamined Patent Application, First Publication No. 2006-244734

[Patent Document 2]

PCT International Publication No. WO 2018/025582

SUMMARY OF INVENTION

Technical Problem

However, for conventional solid electrolyte batteries, there has been a demand to widen the potential windows of solid electrolytes. In addition, in solid electrolyte batteries, there has been demand for a solid electrolyte having a sufficiently high ionic conductivity in order to obtain a high discharge capacity.

The present invention has been made in consideration of the above-described problem, and an objective of the present invention is to provide a solid electrolyte having a wide potential window and a sufficiently high ionic conductivity.

In addition, another objective of the present invention is to provide a solid electrolyte battery that contains the solid electrolyte in any of a solid electrolyte layer, a positive electrode, and a negative electrode; can be operated in a wide potential range; and has a small internal resistance and a large discharge capacity.

Solution to Problem

[1] A solid electrolyte composed of a compound represented by the following formula (1).

$$A_aE_bG_cX_d \quad (1)$$

(in the formula (1), A is at least one element selected from the group consisting of Li, Cs and Ca. E is at least one element selected from the group consisting of Al, Sc, Y, Zr, Hf and lanthanoids. G is at least one group selected from the group consisting of OH, $BO_2$, $BO_3$, $BO_4$, $B_3O_6$, $B_4O_7$, $CO_3$, $NO_3$, $AlO_2$, $SiO_3$, $SiO_4$, $Si_2O_7$, $Si_3O_9$, $Si_4O_{11}$, $Si_6O_{18}$, $PO_3$, $PO_4$, $P_2O_7$, $P_3O_{10}$, $SO_3$, $SO_4$, $SO_5$, $S_2O_3$, $S_2O_4$, $S_2O_5$, $S_2O_6$, $S_2O_7$, $S_2O_8$, $BF_4$, $PF_6$, BOB, $(COO)_2$, N, $AlCl_4$, $CF_3SO_3$, $CH_3COO$, $CF_3COO$, $OOC—(CH_2)_2—COO$, $OOC—CH_2—COO$, OOC—CH(OH)—CH(OH)—COO, OOC—CH(OH)—$CH_2$—COO, $C_6H_5SO_3$, OOC—CH═CH—COO, OOC—CH═CH—COO, $C(OH)(CH_2COOH)_2COO$, $AsO_4$, $BiO_4$, $CrO_4$, $MnO_4$, $PtF_6$, $PtCl_6$, $PtBr_6$, $PtI_6$, $SbO_4$, $SeO_4$, $TeO_4$, HCOO and $CH_3COO$. X is at least one element selected from the group consisting of F, Cl, Br and I. $0.5 \le a < 6$, $0 < b < 2$, $0.1 < c \le 6$ and $0 \le d \le 6.1$. BOB is bisoxalatoborate, $OOC—(CH_2)_2—COO$ is succinate, $OOC—CH_2—COO$ is malonate, OOC—CH(OH)—CH(OH)—COO is tartrate, OOC—CH(OH)—$CH_2$—COO is malate, $C_6H_5SO_3$ is benzene sulfonate, OOC—CH═CH—COO is fumarate, OOC—CH═CH—COO is maleate and $C(OH)(CH_2COOH)_2COO$ is citrate.)

[2] A solid electrolyte battery including a solid electrolyte layer, a positive electrode and a negative electrode, in which at least one selected from the solid electrolyte layer, the positive electrode and the negative electrode contains the solid electrolyte according to [1].

Advantageous Effects of Invention

According to the present invention, it is possible to provide a solid electrolyte having a wide potential window and a sufficiently high ionic conductivity.

In addition, the solid electrolyte battery of the present invention contains the solid electrolyte of the present invention in at least one of the solid electrolyte layer, the positive electrode, and the negative electrode, and thus the solid electrolyte can be operated in a wide potential range, has a small internal resistance, and has a large discharge capacity.

DESCRIPTION OF EMBODIMENTS

Figure 1:
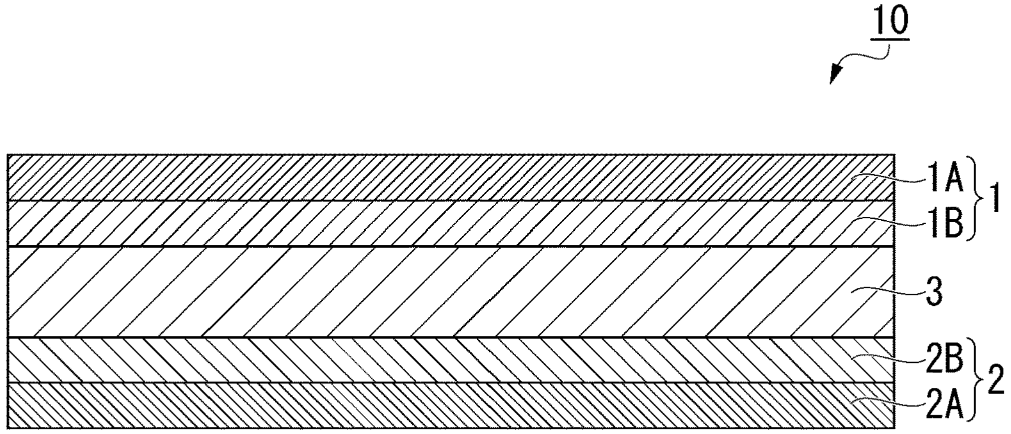
FIG. 1 is a schematic cross-sectional view of a solid electrolyte battery according to the present embodiment.

Hereinafter, a solid electrolyte and a solid electrolyte battery of the present invention will be described in detail.

[Solid Electrolyte]

The solid electrolyte of the present embodiment is composed of a compound represented by the following formula (1).

$$A_aE_bG_cX_d \quad (1)$$

(in the formula (1), A is at least one element selected from the group consisting of Li, Cs and Ca. E is at least one element selected from the group consisting of Al, Sc, Y, Zr, Hf and lanthanoids. G is at least one group selected from the group consisting of OH, $BO_2$, $BO_3$, $BO_4$, $B_3O_6$, $B_4O_7$, $CO_3$, $NO_3$, $AlO_2$, $SiO_3$, $SiO_4$, $Si_2O_7$, $Si_3O_9$, $Si_4O_{11}$, $Si_6O_{18}$, $PO_3$, $PO_4$, $P_2O_7$, $P_3O_{10}$, $SO_3$, $SO_4$, $SO_5$, $S_2O_3$, $S_2O_4$, $S_2O_5$, $S_2O_6$, $S_2O_7$, $S_2O_8$, $BF_4$, $PF_6$, BOB, $(COO)_2$, N, $AlCl_4$, $CF_3SO_3$, $CH_3COO$, $CF_3COO$, OOC—$(CH_2)_2$—COO, OOC—$CH_2$—COO, OOC—CH(OH)—CH(OH)—COO, OOC—CH(OH)—$CH_2$—COO, $C_6H_5SO_3$, OOC—CH═CH—COO, OOC—CH═CH—COO, $C(OH)(CH_2COOH)_2COO$, $AsO_4$, $BiO_4$, $CrO_4$, $MnO_4$, $PtF_6$, $PtCl_6$, $PtBr_6$, $PtI_6$, $SbO_4$, $SeO_4$, $TeO_4$, HCOO and $CH_3COO$. X is at least one element selected from the group consisting of F, Cl, Br and I. $0.5 \leq a < 6$, $0 < b < 2$, $0.1 < c \leq 6$ and $0 \leq d \leq 6.1$. BOB is bisoxalatoborate, OOC—$(CH_2)_2$—COO is succinate, OOC—$CH_2$—COO is malonate, OOC—CH(OH)—CH(OH)—COO is tartrate, OOC—CH(OH)—$CH_2$—COO is malate, $C_6H_5SO_3$ is benzene sulfonate, OOC—CH═CH—COO is fumarate, OOC—CH═CH—COO is maleate and $C(OH)(CH_2COOH)_2COO$ is citrate.)

The solid electrolyte of the present embodiment may be a powder (particles) composed of the compound or may be a sintered body obtained by sintering a powder composed of the compound. In addition, the solid electrolyte of the present embodiment may be a compact formed by compressing a powder, a compact obtained by forming a mixture of a powder and a binder, or a coating film formed by applying a paint containing a powder, a binder, and a solvent and then removing the solvent by heating.

In the compound represented by the formula (1), A is at least one element selected from the group consisting of Li, Cs and Ca. A preferably contains only Li, contains both Li and Cs or contains both Li and Ca since the reduction potential window becomes wide. In a case where A contains Li and Cs, the fractions of Li and Cs are preferably 1.00:0.03 to 1.00:0.20 and more preferably 1.00:0.04 to 1.00:0.10 in terms of mole ratio (Li:Cs) since the reduction potential window becomes wider. In a case where A contains Li and Ca, the fractions of Li and Ca are preferably 1.00:0.03 to 1.00:0.20 and more preferably 1.00:0.04 to 1.00:0.10 in terms of mole ratio (Li:Ca) since the reduction potential window becomes wider.

In the compound represented by the formula (1), in a case where E is Al, Sc, Y and lanthanoids, a is preferably $2.0 \leq a \leq 4.0$ and more preferably $2.5 \leq a \leq 3.5$. In a case where E is Zr or Hf, a is preferably $1.0 \leq a \leq 3.0$ and more preferably $1.5 \leq a \leq 2.5$. In the compound represented by the formula (1), since a is $0.5 \leq a < 6$, the amount of Li that is contained in the compound becomes appropriate, and the solid electrolyte has a high ionic conductivity.

In the compound represented by the formula (1), E is an essential element and an element forming the framework of the compound represented by the formula (1). E is at least one element selected from the group consisting of Al, Sc, Y, Zr, Hf and lanthanoids (La, Ce, Pr, Nd, Pm, Sm, Eu, Gd, Tb, Dy, Ho, Er, Tm, Yb and Lu).

When containing E, the solid electrolyte has a wide potential window and a high ionic conductivity. The solid electrolyte preferably contains, as E, Al, Sc, Y, Zr, Hf and La and particularly preferably contains Zr and Y in order to have a higher ionic conductivity.

In the compound represented by the formula (1), b is $0 < b < 2$. b is preferably $0.6 \leq b$ since the effect of E contained can be more effectively obtained. In addition, E is an element forming the framework of the compound represented by the formula (1) and an element having a relatively large density. When b is $b \leq 1$, the density of the solid electrolyte becomes small, which is preferable.

In the compound represented by the formula (1), G is essential. G is at least one group selected from the group consisting of OH, $BO_2$, $BO_3$, $BO_4$, $B_3O_6$, $B_4O_7$, $CO_3$, $NO_3$, $AlO_2$, $SiO_3$, $SiO_4$, $Si_2O_7$, $Si_3O_9$, $Si_4O_{11}$, $Si_6O_{18}$, $PO_3$, $PO_4$, $P_2O_7$, $P_3O_{10}$, $SO_3$, $SO_4$, $SO_5$, $S_2O_3$, $S_2O_4$, $S_2O_5$, $S_2O_6$, $S_2O_7$, $S_2O_8$, $BF_4$, $PF_6$, BOB, $(COO)_2$, N, $AlCl_4$, $CF_3SO_3$, $CH_3COO$, $CF_3COO$, OOC—$(CH_2)_2$—COO, OOC—$CH_2$—COO, OOC—CH(OH)—CH(OH)—COO, OOC—CH(OH)—$CH_2$—COO, $C_6H_5SO_3$, OOC—CH═CH—COO, OOC—CH═CH—COO, $C(OH)(CH_2COOH)_2COO$, $AsO_4$, $BiO_4$, $CrO_4$, $MnO_4$, $PtF_6$, $PtCl_6$, $PtBr_6$, $PtI_6$, $SbO_4$, $SeO_4$, $TeO_4$, HCOO and $CH_3COO$.

When the compound represented by the formula (1) contains G, the reduction potential window becomes wide. G is preferably at least one group selected from the group consisting of $SO_4$, $CO_3$, OH, $(COO)_2$, $BO_2$, $B_4O_7$, $PO_3$, $BF_4$, $PF_6$, BOB, N, $AlCl_4$ and $CF_3SO_3$ and particularly preferably at least one group selected from the group consisting of $SO_4$, $(COO)_2$, HCOO and $CH_3COO$ since these tend to strongly bond to E in a covalent manner, which makes an E ion unlikely to be reduced in the compound. While the detailed reason is not clear, when E and G tend to strongly bond to each other in a covalent manner, an ionic bond between E and X also becomes strong. Therefore, it is assumed that an E ion in the compound is unlikely to be reduced and the reduction potential window of the compound becomes wide.

In addition, the molecular shape and ion radius of G are considered as described below. First, the main molecular shape and ion radius of G are OH (straight line, 1.19 Å), $CO_3$ (triangle, 1.64 Å), $MnO_4$ (tetrahedron, 2.15 Å), $BF_4$ (tetrahedron, 2.18 Å), $SeO_4$ (tetrahedron, 2.35 Å), $PO_4$ (tetrahedron, 2.38 Å), $CrO_4$ (tetrahedron, 2.40 Å), $SO_4$ (tetrahedron, 2.44 Å), $AsO_4$ (tetrahedron, 2.48 Å), $TeO_4$ (tetrahedron, 2.54 Å), $SbO_4$ (tetrahedron, 2.60 Å), $BiO_4$ (tetrahedron, 2.68 Å), $AlCl_4$ (tetrahedron, 2.81 Å), $PtF_6$ (tetrahedron, 2.82 Å), $PtCl_6$ (tetrahedron, 2.99 Å), $PtBr_6$ (tetrahedron, 3.28 Å) and $PtI_6$ (tetrahedron, 3.28 Å). The structure of $ZrCl_6^{2-}$ in $Li_2ZrCl_6$, which is the origin of $A_aE_bG_cX_d$ according to the present invention, is known as an octahedral structure (B. Krebs, Angew. Chem. Int. Ed. 1969, 8, 146). It is considered that, in $A_aE_bG_cX_d$ according to the present invention, the octahedral structures of $E_bX_d$, which is a basic framework, are in a row. It is inferred that the octahedral structures of $E_bX_d$ in a row are substituted by G in places. For example, when G is $SO_4$ (tetrahedron), it is inferred that $E_bX_d$ (octahedral structures) in a row are substituted by $SO_4$ (tetrahedron) in places in the structure. While the reason is not clear, such a structure is considered to be extremely stable electrochemically. Therefore, it is considered that, when the molecular structure and ion radius of G are as described above, generated $A_aE_bG_cX_d$ becomes extremely stable electrochemically. In particular, when G is a tetrahedral structure such as $SO_4$ and has an ion radius of approximately 2.4 Å, the compound is considered to be more stable electrochemically. Therefore, it is assumed that an E ion in the compound is unlikely to be reduced and the reduction potential window of the compound becomes wide.

In the compound represented by the formula (1), c is $0.1<c\leq 6$. c is preferably $0.5\leq c$ since the effect of G contained to widen the reduction potential window becomes more significant. c is preferably $c\leq 3$ in order to prevent a decrease in the ionic conductivity of the solid electrolyte attributed to an excessively large amount of G.

In the compound represented by the formula (1), X is an element that is contained as necessary. X is at least one selected from the group consisting of F, Cl, Br and I. X has a large ion radius per valence. Therefore, when the compound represented by the formula (1) contains X, the flow of a lithium ion becomes easy, and an effect of increasing the ionic conductivity can be obtained. Cl is preferably contained as X since the ionic conductivity of the solid electrolyte becomes high.

In the compound represented by the formula (1), $0<d\leq 6.1$. In the compound represented by the formula (1), in a case where X is contained in the compound represented by the formula (1), d is preferably $1\leq d$. When d is $1\leq d$, in a case where the solid electrolyte is pressure-formed into a pellet shape, pellets having a sufficient strength can be obtained, which is preferable. In addition, when d is $1\leq d$, an effect of X contained to increase the ionic conductivity can be sufficiently obtained. In addition, d is preferably $d\leq 5$ so as to prevent the amount of X from being excessively large, which makes G insufficient and narrows the potential window of the solid electrolyte.

In the compound represented by the formula (1), a compound in which A is Li, E is Zr, G is $SO_4$, $CO_3$, OH, $(COO)_2$, $BO_2$, $B_4O_7$, $PO_3$, $BF_4$, $PF_6$, BOB, N, $AlCl_4$ and $CF_3SO_3$ and X is Cl is preferable since the potential window becomes wide and the ionic conductivity becomes high in the solid electrolyte. Specifically, the compound represented by the formula (1) is preferably any one selected from $Li_2ZrSO_4Cl_4$, $LiZrSO_4Cl_3$, $Li_2ZrCO_3Cl_4$, $Li_2Zr(OH)Cl_5$, $Li_2Zr((COO)_2)_{0.5}Cl_5$, $Li_2ZrBO_2Cl_5$, $Li_2Zr(B_4O_7)_{0.5}Cl_5$, $Li_2Zr(PO_3)Cl_5$, $Li_2Zr(BF_4)_{0.5}Cl_{5.5}$, $Li_2Zr(PF_6)_{0.1}Cl_{5.9}$, $Li_2Zr(BOB)_{0.1}Cl_{5.9}$, $Li_2ZrN_{0.1}CO_{5.7}$, $Li_2Zr(AlCl_4)Cl_5$, $Li_2Zr(CF_3SO_3)_{0.1}Cl_{5.9}$, $Li_2Zr(HCOO)_{0.5}Cl_{5.5}$ and $Li_2Zr(CH_3COO)_{0.5}Cl_{5.5}$ since the balance of the ionic conductivity and the potential window of the solid electrolyte becomes favorable.

(Manufacturing Method for Solid Electrolyte)

In a case where the solid electrolyte of the present embodiment is in a powder state, the solid electrolyte can be produced by, for example, a method in which raw material powders containing predetermined elements are mixed in predetermined mole fractions and reacted, a so-called mechanochemical method.

In a case where the solid electrolyte of the present embodiment is a sintered body, the solid electrolyte can be produced by, for example, a method to be described below. First, raw material powders containing predetermined elements are mixed in predetermined mole fractions. Next, the mixture of the raw material powders is formed into a predetermined shape and sintered in a vacuum or in an inert gas atmosphere.

In a case where a halide raw material is contained in the raw material powders, the halide raw material is likely to evaporate when the temperature is raised. Therefore, a halogen may be supplemented by causing a halogen gas to coexist in the atmosphere at the time of sintering the mixture. In addition, in a case where the halide raw material is contained in the raw material powders, the mixture may be sintered by a hot pressing method using a highly sealed mold. In this case, since the mold is highly sealed, it is possible to suppress the evaporation of the halide raw material due to the sintering. The mixture is sintered as described above, whereby a solid electrolyte in a state of a sintered body composed of a compound having a predetermined composition is obtained.

In the present embodiment, in the manufacturing steps of the solid electrolyte, a heat treatment may be performed as necessary. The crystallite size of the solid electrolyte can be adjusted by performing a heat treatment. The heat treatment is preferably performed, for example, in an argon gas atmosphere at 130° C. to 650° C. for 0.5 to 60 hours and more preferably performed at 175° C. to 600° C. for one to 30 hours. When the heat treatment is performed in an argon gas atmosphere at 150° C. to 550° C. for five to 24 hours, a solid electrolyte having a crystallite size of 5 nm to 500 nm can be obtained.

The solid electrolyte of the present embodiment is composed of the compound represented by the formula (1), and thus the reduction potential window becomes wide. The detailed reason therefor is not clear but is considered as described below.

In the compound represented by the formula (1), G is at least one group selected from the group consisting of OH, $BO_2$, $BO_3$, $BO_4$, $B_3O_6$, $B_4O_7$, $CO_3$, $NO_3$, $AlO_2$, $SiO_3$, $SiO_4$, $Si_2O_7$, $Si_3O_9$, $Si_4O_{11}$, $Si_6O_{18}$, $PO_3$, $PO_4$, $P_2O_7$, $P_3O_{10}$, $SO_3$, $SO_4$, $SO_5$, $S_2O_3$, $S_2O_4$, $S_2O_5$, $S_2O_6$, $S_2O_7$, $S_2O_8$, $BF_4$, $PF_6$, BOB, $(COO)_2$, N, $AlCl_4$, $CF_3SO_3$, $CH_3COO$, $CF_3COO$, $OOC—(CH_2)_2—COO$, $OOC—CH_2—COO$, OOC—CH(OH)—CH(OH)—COO, $OOC—CH(OH)—CH_2—COO$, $C_6H_5SO_3$, OOC—CH═CH—COO, OOC—CH═CH—COO, $C(OH)(CH_2COOH)_2COO$, $AsO_4$, $BiO_4$, $CrO_4$, $MnO_4$, $PtF_6$, $PtCl_6$, $PtBr_6$, $PtI_6$, $SbO_4$, $SeO_4$, $TeO_4$, HCOO and $CH_3COO$. G is considered to strongly bond to E in a covalent manner. Therefore, even when the potential becomes close to the potential with respect to Li metal, a reaction where an E ion in the compound is reduced is unlikely to occur, the compound represented by the formula (1) is stable, and the reduction potential window is wide. Therefore, in solid electrolyte batteries having a solid electrolyte layer containing the compound represented by the formula (1), it is possible to increase the potential difference between a positive electrode and a negative electrode using a negative electrode active material having a low potential of the oxidation-reduction potential and to increase the energy.

In contrast, for example, in a compound containing X (at least one selected from the group consisting of F, Cl, Br and I) instead of G in the compound represented by the formula (1), when the potential becomes close to the potential with respect to Li metal, an E ion in the compound is easily reduced. This is because the bonding force between X and E is weaker than the bonding force between G and E. Therefore, in the compound containing X instead of G in the compound represented by the formula (1), the reduction potential window becomes narrow compared with that of the compound represented by the formula (1).

[Solid Electrolyte Battery]

FIG. 1 is a schematic cross-sectional view of a solid electrolyte battery according to the present embodiment.

A solid electrolyte battery 10 shown in FIG. 1 includes a positive electrode 1, a negative electrode 2 and a solid electrolyte layer 3.

The solid electrolyte layer 3 is sandwiched between the positive electrode 1 and the negative electrode 2. The solid electrolyte layer 3 contains the above-described solid electrolyte.

The positive electrode 1 and the negative electrode 2 are connected to external terminals (not shown) and are electrically connected with the outside.

The solid electrolyte battery 10 is charged or discharged by the transfer of ions through the solid electrolyte layer 3 and electrons through an external circuit between the positive electrode 1 and the negative electrode 2. The solid electrolyte battery 10 may be a laminate in which the positive electrode 1, the negative electrode 2, and the solid electrolyte layer 3 are laminated or may be a wound body obtained by winding the laminate. The solid electrolyte battery is used in, for example, laminated batteries, rectangular batteries, cylindrical batteries, coin batteries, button batteries, and the like.

(Positive Electrode)

As shown in FIG. 1, the positive electrode 1 has a positive electrode mixture layer 1B provided on a sheet-shaped (foil-shaped) positive electrode current collector 1A.

(Positive Electrode Current Collector)

The positive electrode current collector 1A may be an electron conductive material that is resistant to oxidation during charging and does not easily corrode. As the positive electrode current collector 1A, for example, metals such as aluminum, stainless steel, nickel and titanium, or conductive resins can be used. The positive electrode current collector 1A may have each of a powder form, a foil form, a punched form, and an expanded form.

(Positive Electrode Mixture Layer)

The positive electrode mixture layer 1B contains a positive electrode active material and contains a solid electrolyte, a binder, and a conductive auxiliary agent as necessary.

(Positive Electrode Active Material)

The positive electrode active material is not particularly limited as long as the positive electrode active material is capable of reversibly progressing the absorption, emission, intercalation and deintercalation of lithium ions. As the positive electrode active material, it is possible to use positive electrode active materials that are used in well-known lithium-ion secondary batteries. Examples of the positive electrode active material include lithium-containing metal oxides, lithium-containing metal-phosphorus oxides and the like.

Examples of the lithium-containing metal oxides include lithium cobalt oxide ($LiCoO_2$), lithium nickel oxide ($LiNiO_2$), lithium manganese spinel ($LiMn_2O_4$), composite metal oxides represented by a general formula: $LiNi_xCo_yMn_zO_2$ (x+y+z=1), lithium vanadium compounds ($LiVOPO_4$ and $Li_3V_2(PO_4)_3$), olivine-type $LiMPO_4$ (where M indicates at least one selected from Co, Ni, Mn, and Fe), lithium titanate ($Li_4Ti_5O_{12}$), and the like.

In addition, positive electrode active materials containing no lithium can also be used. Examples of such positive electrode active materials include metal oxides containing no lithium ($MnO_2$, $V_2O_5$ and the like), metal sulfides containing no lithium ($MoS_2$ and the like), fluorides containing no lithium ($FeF_3$, $VF_3$ and the like), and the like.

In the case of using such a positive electrode active material containing no lithium, lithium ions need to be doped into the negative electrode in advance, or a negative electrode containing lithium ions needs to be used.

(Binder)

The positive electrode mixture layer 1B preferably contains a binder. The binder bonds the positive electrode active material, the solid electrolyte, and the conductive auxiliary agent that configure the positive electrode mixture layer 1B to one another. In addition, the binder attaches the positive electrode mixture layer 1B and the positive electrode current collector 1A. Examples of characteristics required for the binder include oxidation resistance, favorable adhesiveness and the like.

Examples of the binder that is used in the positive electrode mixture layer 1B include polyvinylidene fluoride (PVDF) or copolymers thereof, polytetrafluoroethylene (PTFE), polyamide (PA), polyimide (PI), polyamide-imide (PAI), polybenzimidazole (PBI), polyether sulfone (PES), polyacrylic acids (PA), and copolymers thereof, metal ion-crosslinked products of polyacrylic acids (PA) and the copolymers thereof, polypropylene (PP) in which maleic anhydride is grafted, polyethylene (PE) in which maleic anhydride is grafted, mixture thereof, and the like. Among these, as the binder, PVDF is particularly preferably used.

The content rate of the solid electrolyte in the positive electrode mixture layer 1B is not particularly limited but is preferably 1 vol % to 50 vol % and more preferably 5 vol % to 30 vol % based on the total mass of the positive electrode active material, the solid electrolyte, the conductive auxiliary agent and the binder.

The content rate of the binder in the positive electrode mixture layer 1B is not particularly limited but is preferably 1 mass % to 15 mass % and more preferably 3 mass % to 5 mass % based on the total mass of the positive electrode active material, the solid electrolyte, the conductive auxiliary agent, and the binder. When the content rate of the binder is too small, there is a tendency that it becomes impossible to form the positive electrode 1 having a sufficient adhesive strength. In addition, ordinary binders are electrochemically inactive and do not contribute to discharge capacities. Therefore, when the content rate of the binder is too large, there is a tendency that it becomes difficult to obtain a sufficient volume energy density or mass energy density.

(Conductive Auxiliary Agent)

The conductive auxiliary agent is not particularly limited as long as the conductive auxiliary agent improves the electron conductivity of the positive electrode mixture layer 1*i*, and well-known conductive auxiliary agents can be used.

Examples thereof include carbon materials such as carbon black, graphite, carbon nanotubes and graphene, metals such as aluminum, copper, nickel, stainless steel, iron and amorphous metals, conductive oxides such as ITO or mixtures thereof. The conductive auxiliary agent may have each of a powder form and a fiber form.

The content rate of the conductive auxiliary agent in the positive electrode mixture layer 1B is not particularly limited. In a case where the positive electrode mixture layer 1B contains the conductive auxiliary agent, the content rate of the conductive auxiliary agent is preferably 0.5 mass % to 20 mass % and more preferably 1 mass % to 5 mass % based on the total mass of the positive electrode active material, the solid electrolyte, the conductive auxiliary agent, and the binder.

(Negative Electrode)

As shown in FIG. 1, the negative electrode 2 has a negative electrode mixture layer 2B provided on a negative electrode current collector 2A.

(Negative Electrode Current Collector)

The negative electrode current collector 2A needs to be conductive. As the negative electrode current collector 2A, for example, metals such as copper, aluminum, nickel, stainless steel, and iron or conductive resin foils can be used. The negative electrode current collector 2A may have each of a powder form, a foil form, a punched form and an expanded form.

(Negative Electrode Mixture Layer)

The negative electrode mixture layer 2B contains a negative electrode active material and contains a solid electrolyte, a binder, and a conductive auxiliary agent as necessary.

(Negative Electrode Active Material)

The negative electrode active material is not particularly limited as long as the negative electrode active material is capable of reversibly progressing the absorption and emission of lithium ions and the intercalation and deintercalation of lithium ions. As the negative electrode active material, it is possible to use negative electrode active materials that are used in well-known lithium-ion secondary batteries.

Examples of the negative electrode active material include carbon materials such as natural graphite, artificial graphite, mesocarbon microbeads, mesocarbon fibers (MCF), cokes, glassy carbon and fired products of organic compounds, metals that can be combined with lithium such as Si, $SiO_x$, Sn and aluminum, alloys thereof, composite materials of the metal and the carbon material, oxides such as lithium titanate ($Li_4Ti_5O_{12}$) and $SnO_2$, metallic lithium, and the like.

(Binder)

The negative electrode mixture layer 2B preferably contains a binder. The binder bonds the negative electrode active material, the solid electrolyte and the conductive auxiliary agent that configure the negative electrode mixture layer 2B to one another. In addition, the binder attaches the negative electrode mixture layer 2B and the negative electrode current collector 2A. Examples of characteristics required for the binder include reduction resistance, favorable adhesiveness, and the like.

Examples of the binder that is used in the negative electrode mixture layer 2B include polyvinylidene fluoride (PVDF) or copolymers thereof, polytetrafluoroethylene (PTFE), polyamide (PA), polyimide (PI), polyamide-imide (PAI), polybenzimidazole (PBI), styrene butadiene rubber (SBR), carboxymethyl cellulose (CMC), polyacrylic acids (PA) and copolymers thereof, metal ion-crosslinked products of polyacrylic acids (PA) and the copolymers thereof, polypropylene (PP) in which maleic anhydride is grafted, polyethylene (PE) in which maleic anhydride is grafted, mixture thereof, and the like. Among these, as the binder, one or more selected from SBR, CMC and PVDF are preferably used.

The content rate of the solid electrolyte in the negative electrode mixture layer 2B is not particularly limited but is preferably 1 vol % to 50 vol % and more preferably 5 vol % to 30 vol % based on the total mass of the negative electrode active material, the solid electrolyte, the conductive auxiliary agent and the binder.

The content rate of the binder in the negative electrode mixture layer 2B is not particularly limited but is preferably 1 mass % to 15 mass % and more preferably 1.5 mass % to 10 mass % based on the total mass of the negative electrode active material, the conductive auxiliary agent and the binder. When the content rate of the binder is too small, there is a tendency that it becomes impossible to form the negative electrode 2 having a sufficient adhesive strength. In addition, ordinary binders are electrochemically inactive and do not contribute to discharge capacities. Therefore, when the content rate of the binder is too large, there is a tendency that it becomes difficult to obtain a sufficient volume energy density or mass energy density.

(Conductive Auxiliary Agent)

As the conductive auxiliary agent that may be contained in the negative electrode mixture layer 2B, the same conductive auxiliary agent as the above-described conductive auxiliary agent that may be contained in the positive electrode mixture layer 1B such as carbon materials can be used.

The content rate of the conductive auxiliary agent in the negative electrode mixture layer 2B is not particularly limited. In a case where the negative electrode mixture layer 2B contains the conductive auxiliary agent, the content rate of the conductive auxiliary agent is preferably 0.5 mass % to 20 mass % and more preferably set to 1 mass % to 12 mass % with respect to the negative electrode active material.

(Exterior Body)

In the solid electrolyte battery of the present embodiment, a battery element composed of the positive electrode 1, the solid electrolyte layer 3 and the negative electrode 2 is accommodated and sealed in an exterior body. The exterior body needs to be an exterior body capable of suppressing the intrusion of moisture or the like into the inside from the outside and is not particularly limited.

For example, as the exterior body, it is possible to use an exterior body produced by forming a metal laminate film in a pouch shape. Here, the metal laminate film is produced by coating both surfaces of a metal foil with polymer films. Such an exterior body is sealed by heat-sealing an opening part.

As the metal foil that forms the metal laminate film, for example, an aluminum foil, a stainless steel foil and the like can be used. As the polymer film that is disposed outside the exterior body, a polymer having a high melting point is preferably used, and, for example, polyethylene terephthalate (PET), polyamide and the like are preferably used. As the polymer film that is disposed inside the exterior body, for example, polyethylene (PE), polypropylene (PP) and the like are preferably used.

(External Terminals)

A positive electrode terminal is electrically connected to the positive electrode 1 of the battery element. In addition, a negative electrode terminal is electrically connected to the negative electrode 2. In the present embodiment, the positive electrode terminal is electrically connected to the positive electrode current collector 1A. In addition, the negative electrode terminal is electrically connected to the negative electrode current collector 2A. The connection portions between the positive electrode current collector 1A or the negative electrode current collector 2A and the external terminals (the positive electrode terminal and the negative electrode terminal) are disposed inside the exterior body.

As the external terminals, it is possible to use, for example, terminals formed of a conductive material such as aluminum or nickel.

A film composed of PE in which maleic anhydride is grafted (hereinafter, referred to as “acid-modified PE” in some cases) or PP in which maleic anhydride is grafted (hereinafter, referred to as “acid-modified PP” in some cases) is preferably disposed between the exterior body and the external terminal. Portions where the acid-modified PE or acid-modified PP is disposed are heat-sealed, whereby the solid electrolyte battery becomes favorable in terms of the adhesion between the exterior body and the external terminals.

[Manufacturing Method for Solid Electrolyte Battery]

Next, a manufacturing method for the solid electrolyte battery according to the present embodiment will be described.

First, the above-described solid electrolyte that serves as the solid electrolyte layer 3 included in the solid electrolyte battery 10 of the present embodiment is prepared. In the present embodiment, as the material of the solid electrolyte layer 3, a solid electrolyte in a powder state is used. The solid electrolyte layer 3 can be produced using a powder forming method.

In addition, for example, a paste containing a positive electrode active material is applied onto the positive electrode current collector 1A and dried to form the positive electrode mixture layer 1, thereby manufacturing the positive electrode 1. In addition, for example, a paste containing a negative electrode active material is applied onto the negative electrode current collector 2A and dried to form the negative electrode mixture layer 2B, thereby manufacturing the negative electrode 2.

Next, for example, a guide having a hole portion is installed on the positive electrode 1, and the solid electrolyte is loaded into the inside of the guide. After that, the surface of the solid electrolyte is levelled, and the negative electrode 2 is overlaid on the solid electrolyte. Therefore, the solid electrolyte is sandwiched between the positive electrode 1 and the negative electrode 2. After that, a pressure is applied to the positive electrode 1 and the negative electrode 2, thereby pressure-forming the solid electrolyte. The solid electrolyte is pressure-formed, thereby obtaining a laminate in which the positive electrode 1, the solid electrolyte layer 3 and the negative electrode 2 are laminated in this order.

Next, the positive electrode current collector 1A in the positive electrode 1 and the negative electrode current collector 2A in the negative electrode 2, which form the laminate, are welded to external terminals by a well-known method, respectively, thereby electrically connecting the positive electrode current collector 1A or the negative electrode current collector 2A to the external terminal. After that, the laminate connected to the external terminals is accommodated in an exterior body, and the opening part of the exterior body is sealed by heat sealing.

The solid electrolyte battery 10 of the present embodiment is obtained by the above-described steps.

In the above-described manufacturing method for the solid electrolyte battery 10, a case where the solid electrolyte in a powder state is used has been described, but a solid electrolyte in a sintered body state may also be used. In this case, the solid electrolyte battery 10 having the solid electrolyte layer 3 is obtained by a method in which the solid electrolyte in a sintered body state is sandwiched between the positive electrode 1 and the negative electrode 2 and pressure-formed.

The solid electrolyte layer 3 of the present embodiment contains the solid electrolyte of the present embodiment having a wide potential window and a sufficiently high ionic conductivity. Therefore, the solid electrolyte battery 10 of the present embodiment including the solid electrolyte layer 3 of the present embodiment can be operated in a wide potential range and has a small internal resistance and a large discharge capacity.

Hitherto, the embodiment of the present invention has been described in detail with reference to the drawings, but each configuration in each embodiment, a combination thereof, and the like are examples, and the addition, omission, substitution, and other modification of the configuration are possible within the scope of the gist of the present invention.

EXAMPLES

Example 1 to Example 100

Solid electrolytes in powder states composed of compounds having compositions shown in Table 7 to Table 12 of Example 1 to Example 100 were manufactured by a method in which raw material powders containing predetermined original materials in mole fractions shown in Table 1 to Table 6 were mixed and reacted for 24 hours using a planetary ball mill with a rotation speed set to 500 rpm, a revolving speed set to 500 rpm and a rotation direction and a revolution direction set to be opposite to each other.

The compositions of the respective solid electrolytes were obtained by a method in which individual elements, excluding oxygen, were analyzed using a high-frequency inductively coupled plasma (ICP) atomic emission spectrometer (manufactured by Shimadzu Corporation). For solid electrolytes containing fluorine, the amounts of fluorine that was contained in the solid electrolytes were analyzed using an ion chromatography device (manufactured by Thermo Fisher Scientific Inc.) method.

In addition, as a sealed container and balls for the planetary ball mill, a zirconia container and zirconia balls were used. Therefore, zirconium derived from the sealed container and the balls was incorporated into the manufactured compounds as contamination by accident. It is known that the contamination amount of the zirconium derived from the sealed container and the balls is a certain constant amount. Table 7 to Table 12 show actual measurement values of the amounts of zirconium in the compounds.

Table 1 to Table 6 show raw materials used in each solid electrolyte and the fractions of the raw materials blended (mole fractions), respectively.

In addition, in Table 7 to Table 12, for the compositions of the respective solid electrolytes, “O” is given in a case where the above-described formula (1) was satisfied, and “x” is given otherwise. Furthermore, Table 7 to Table 12 show “E”, “G”, “valence of G”, “X”, “a”, “b”, “c” and “d” at the time of applying the compositions of the respective solid electrolytes to the formula (1), respectively.

TABLE 1

| | Raw materials | | | | Fractions of raw materials blended (mole fractions) | | | |
|---|---|---|---|---|---|---|---|---|
| | Material I | Material II | Material III | Material IV | Material I | Material II | Material III | Material IV |
| Example 1 | LiCl | $Li_2SO_4$ | $ZrCl_4$ | — | 1.0 | 0.5 | 1.0 | — |
| Example 2 | — | $Li_2SO_4$ | $ZrCl_4$ | — | — | 1.0 | 1.0 | — |
| Example 3 | — | $Li_2SO_4$ | $ZrCl_4$ | $Zr(SO_4)_2$ | — | 0.25 | 1.375 | 0.375 |
| Example 4 | — | $Li_2SO_4$ | $ZrCl_4$ | $Zr(SO_4)_2$ | — | 1.0 | 0.75 | 0.25 |
| Example 5 | — | $Li_2SO_4$ | $ZrCl_4$ | $Zr(SO_4)_2$ | — | 1.0 | 0.50 | 0.50 |
| Example 6 | — | $Li_2SO_4$ | $ZrCl_4$ | $Zr(SO_4)_2$ | — | 1.0 | 0.25 | 0.75 |
| Example 7 | — | $Li_2SO_4$ | — | $Zr(SO_4)_2$ | — | 1.0 | — | 1.0 |
| Example 8 | — | $Li_2SO_4$ | $ZrCl_4$ | $ZrF_4$ | — | 1.0 | 0.75 | 0.25 |
| Example 9 | — | $Li_2SO_4$ | $ZrCl_4$ | $ZrBr_4$ | — | 1.0 | 0.75 | 0.25 |
| Example 10 | — | $Li_2SO_4$ | $ZrCl_4$ | $ZrI_4$ | — | 1.0 | 0.75 | 0.25 |
| Example 11 | LiCl | $Li_2SO_4$ | $ZrCl_4$ | — | 0.4 | 1.0 | 0.9 | — |
| Example 12 | LiCl | $Li_2SO_4$ | $ZrCl_4$ | — | 0.8 | 1.0 | 0.8 | — |
| Example 13 | LiCl | $Li_2SO_4$ | $ZrCl_4$ | — | 1.2 | 1.0 | 0.7 | — |
| Example 14 | LiCl | $Li_2SO_4$ | $ZrCl_4$ | CsCl | 0.3 | 1.0 | 0.9 | 0.1 |
| Example 15 | LiCl | $Li_2SO_4$ | $ZrCl_4$ | CsCl | 0.6 | 1.0 | 0.8 | 0.2 |
| Example 16 | LiCI | $Li_2SO_4$ | $ZrCl_4$ | CsCl | 0.9 | 1.0 | 0.7 | 0.3 |

TABLE 2

| | Raw materials | | | | Fractions of raw materials blended (mole fractions) | | | |
|---|---|---|---|---|---|---|---|---|
| | Material I | Material II | Material III | Material IV | Material I | Material II | Material III | Material IV |
| Example 17 | LiCl | $Li_2SO_4$ | $ZrCl_4$ | CsCl | 0.2 | 1.0 | 0.9 | 0.2 |
| Example 18 | LiCl | $Li_2SO_4$ | $ZrCl_4$ | CsCl | 0.1 | 1.0 | 0.9 | 0.3 |
| Example 19 | — | $Li_2SO_4$ | $ZrCl_4$ | CsCl | — | 1.0 | 0.9 | 0.4 |
| Example 20 | — | $Li_2SO_4$ | $ZrCl_4$ | $Zr(SO_4)_2$ | — | 0.5 | 0.75 | 0.25 |
| Example 21 | — | $Li_2SO_3$ | $ZrCl_4$ | — | — | 1.0 | 1.0 | — |
| Example 22 | — | $Li_2SO_5$ | $ZrCl_4$ | — | — | 1.0 | 1.0 | — |
| Example 23 | — | $Li_2S_2O_3$ | $ZrCl_4$ | — | — | 1.0 | 1.0 | — |
| Example 24 | — | $Li_2S_2O_4$ | $ZrCl_4$ | — | — | 1.0 | 1.0 | — |
| Example 25 | — | $Li_2S_2O_5$ | $ZrCl_4$ | — | — | 1.0 | 1.0 | — |
| Example 26 | — | $LiS_2O_6$ | $ZrCl_4$ | — | — | 1.0 | 1.0 | — |
| Example 27 | — | $LiS_2O_7$ | $ZrCl_4$ | — | — | 1.0 | 1.0 | — |
| Example 28 | — | $LiS_2O_8$ | $ZrCl_4$ | — | — | 1.0 | 1.0 | — |
| Example 29 | LiCl | LiOH | $ZrCl_4$ | — | 1.0 | 1.0 | 1.0 | — |
| Example 30 | — | LiOH | $ZrCl_4$ | — | — | 2.0 | 1.0 | — |
| Example 31 | LiCl | $LiBO_2$ | $ZrCl_4$ | — | 1.0 | 1.0 | 1.0 | — |
| Example 32 | — | $Li_3BO_3$ | $ZrCl_4$ | $Zr_3(BO_3)_4$ | — | 0.66 | 0.753 | 0.0825 |

TABLE 3

| | Raw materials | | | | Fractions of raw materials blended (mole fractions) | | | |
|---|---|---|---|---|---|---|---|---|
| | Material I | Material II | Material III | Material IV | Material I | Material II | Material III | Material IV |
| Example 33 | — | $Li_5BO_4$ | $ZrCl_4$ | $Zr_5(BO_4)_4$ | — | 0.4 | 0.25 | 0.15 |
| Example 34 | — | $Li_3B_3O_6$ | $ZrCl_4$ | $Zr_3(B_3O_6)_4$ | — | 0.666 | 0.75 | 0.0833 |
| Example 35 | — | $Li_2B_4O_7$ | $ZrCl_4$ | — | — | 1.0 | 1.0 | — |
| Example 36 | LiCl | $Li_2CO_3$ | $ZrCl_4$ | — | 1.0 | 0.5 | — | — |
| Example 37 | — | $Li_2CO_3$ | $ZrCl_4$ | — | — | 1.0 | 1.0 | — |
| Example 38 | — | $Li_2CO_3$ | $ZrCl_4$ | $Zr(CO_3)_2$ | — | 1.0 | 0.75 | 0.25 |
| Example 39 | — | $Li_2CO_3$ | $ZrCl_4$ | $Zr(CO_3)_2$ | — | 1.0 | 0.50 | 0.50 |
| Example 40 | — | $Li_2CO_3$ | $ZrCl_4$ | $Zr(CO_3)_2$ | — | 1.0 | 0.25 | 0.75 |
| Example 41 | — | $Li_2CO_3$ | — | $Zr(CO_3)_2$ | — | 1.0 | — | 1.0 |
| Example 42 | LiCl | $LiNO_3$ | $ZrCl_4$ | — | 1.0 | 1.0 | 1.0 | — |
| Example 43 | — | $LiNO_3$ | $ZrCl_4$ | — | — | 2.0 | 1.0 | — |
| Example 44 | LiCl | $LiAlO_2$ | $ZrCl_4$ | — | 1.0 | 2.0 | 1.0 | — |
| Example 45 | — | $Li_2SiO_3$ | $ZrCl_4$ | — | — | 1.0 | 1.0 | — |
| Example 46 | — | $Li_4SiO_4$ | $ZrCl_4$ | $ZrSiO_4$ | — | 0.5 | 0.5 | 0.5 |

TABLE 4

| | Raw materials | | | | Fractions of raw materials blended (mole fractions) | | | |
|---|---|---|---|---|---|---|---|---|
| | Material I | Material II | Material III | Material IV | Material I | Material II | Material III | Material IV |
| Example 47 | — | $Li_6Si_2O_7$ | — | $Zr_3(Si_2O_7)_2$ | — | 0.333 | — | 0.333 |
| Example 48 | — | $Li_6Si_3O_9$ | — | $Zr_3(Si_3O_9)_2$ | — | 0.333 | — | 0.333 |
| Example 49 | — | $Li_6Si_4O_{11}$ | — | $Zr_3(Si_4O_{11})_2$ | — | 0.333 | — | 0.333 |
| Example 50 | — | $Li_{12}Si_6O_{18}$ | — | $Zr_3Si_6O_{18}$ | — | 0.167 | — | 0.333 |
| Example 51 | LiCl | $LiPO_3$ | $ZrCl_4$ | — | 1.5 | 0.5 | 1.0 | — |
| Example 52 | — | $Li_3PO_4$ | $ZrCl_4$ | $Zr_3(PO_4)_4$ | — | 0.666 | 0.75 | 0.0833 |
| Example 53 | $AlCl_3$ | $Li_3PO_4$ | $ZrCl_4$ | — | 0.3 | 0.43 | 0.7 | — |
| Example 54 | $CaCl_2$ | $Li_3PO_4$ | $ZrCl_4$ | — | 0.1 | 0.4 | 0.9 | — |
| Example 55 | $CaCl_2$ | $Li_3PO_4$ | $ZrCl_4$ | $ZrF_4$ | 0.1 | 0.4 | 0.8 | 0.10 |
| Example 56 | $AlCl_3$ | $Li_3PO_4$ | $ZrCl_4$ | $ZrF_4$ | 0.1 | 0.37 | 0.83 | 0.075 |
| Example 57 | $YCl_3$ | $Li_3PO_4$ | $ZrCl_4$ | — | 0.1 | 0.37 | 0.9 | — |
| Example 58 | — | $Li_4P_2O_3$ | $ZrCl_4$ | $Zr_3(P_2O_3)_3$ | — | 0.5 | 0.5 | 0.1667 |
| Example 59 | — | $Li_4P_2O_7$ | $ZrCl_4$ | $Zr_3(P_2O_7)_3$ | — | 0.5 | 0.5 | 0.1667 |
| Example 60 | — | $Li_5P_3O_{10}$ | $ZrCl_4$ | $Zr_5(P_3O_{10})_4$ | — | 0.4 | 0.25 | 0.15 |

TABLE 5

| | Raw materials | | | | Fractions of raw materials blended (mole fractions) | | | |
|---|---|---|---|---|---|---|---|---|
| | Material I | Material II | Material III | Material IV | Material I | Material II | Material III | Material IV |
| Example 61 | LiCl | $Li_2SO_4$ | $AlCl_3$ | — | 1.0 | 1.0 | 1.0 | — |
| Example 62 | LiCl | $Li_2SO_4$ | $ScCl_3$ | — | 1.0 | 1.0 | 1.0 | — |
| Example 63 | LiCl | $Li_2SO_4$ | $YCl_3$ | — | 1.0 | 1.0 | 1.0 | — |
| Example 64 | LiCl | $Li_2SO_4$ | $YCl_3$ | — | 3.7 | 1.0 | 0.1 | — |
| Example 65 | — | $Li_2SO_4$ | $HfCl_4$ | — | — | 1.0 | 1.0 | — |
| Example 66 | LiCl | $Li_2SO_4$ | $LaCl_3$ | — | 1.0 | 1.0 | 1.0 | — |
| Example 67 | LiCl | $LiBF_4$ | $ZrCl_4$ | — | 1.5 | 0.5 | 1.0 | — |
| Example 68 | LiCl | $LiPF_6$ | $ZrCl_4$ | — | 1.9 | 0.1 | 1.0 | — |
| Example 69 | LiCl | LiBOB | $ZrCl_4$ | — | 1.9 | 0.1 | 1.0 | — |
| Example 70 | LiCl | $(COOLi)_2$ | $ZrCl_4$ | — | 1.5 | 0.25 | 1.0 | — |
| Example 71 | LiCl | $(COOLi)_2$ | $ZrCl_4$ | — | 1.0 | 0.5 | 1.0 | — |
| Example 72 | LiCl | $Li_3N$ | $ZrCl_4$ | — | 1.85 | 0.05 | 1.0 | — |
| Example 73 | LiCl | $Li_3N$ | $ZrCl_4$ | — | 1.7 | 0.1 | 1.0 | — |
| Example 74 | LiCl | $Li_3N$ | $ZrCl_4$ | — | 1.0 | 0.333 | 1.0 | — |
| Example 75 | LiCl | $AlCl_3$ | $ZrCl_4$ | — | 2.0 | 1.0 | 1.0 | — |
| Example 76 | LiCl | $AlCl_3$ | $ZrCl_4$ | — | 2.0 | 1.5 | 1.0 | — |
| Example 77 | LiCl | $CF_3SO_4Li$ | $ZrCl_4$ | — | 1.9 | 0.1 | 1.0 | — |
| Example 78 | LiCl | $CH_3COOLi$ | $ZrCl_4$ | — | 1.9 | 0.1 | 1.0 | — |
| Example 79 | LiCl | $CF_3COOLi$ | $ZrCl_4$ | — | 1.9 | 0.1 | 1.0 | — |

TABLE 6

| | Raw materials | | | | Fractions of raw materials blended (mole fractions) | | | |
|---|---|---|---|---|---|---|---|---|
| | Material I | Material II | Material III | Material IV | Material I | Material II | Material III | Material IV |
| Example 80 | LiCl | $LiOOC(CH_2)_2COOLi$ | $ZrCl_4$ | — | 1.9 | 0.1 | 1.0 | — |
| Example 81 | LiCl | $LiOOCCH_2COOLi$ | $ZrCl_4$ | — | 1.9 | 0.1 | 1.0 | — |
| Example 82 | LiCl | LiOOCCH(OH)CH(OH)COOLi | $ZrCl_4$ | — | 1.9 | 0.1 | 1.0 | — |
| Example 83 | LiCl | $LiOOCCH(OH)CH_2COOLi$ | $ZrCl_4$ | — | 1.9 | 0.1 | 1.0 | — |
| Example 84 | LiCl | $C_6H_5SO_3Li$ | $ZrCl_4$ | — | 1.9 | 0.1 | 1.0 | — |
| Example 85 | LiCl | LiOOCCHCHCOOLi | $ZrCl_4$ | — | 1.9 | 0.1 | 1.0 | — |
| Example 86 | LiCl | LiOOCCHCHCOOLi | $ZrCl_4$ | — | 1.9 | 0.1 | 1.0 | — |
| Example 87 | LiCl | $C(OH)(CH_2COOH)_2COOLi$ | $ZrCl_4$ | — | 1.9 | 0.1 | 1.0 | — |
| Example 88 | — | $Li_2MnO_4$ | $ZrCl_4$ | — | — | 1.0 | 1.0 | — |
| Example 89 | — | $Li_2SeO_4$ | $ZrCl_4$ | — | — | 1.0 | 1.0 | — |
| Example 90 | — | $Li_2CrO_4$ | $ZrCl_4$ | — | — | 1.0 | 1.0 | — |
| Example 91 | LiCl | $Li_3AsO_4$ | $ZrCl_4$ | — | 0.5 | 0.5 | 1.0 | — |
| Example 92 | LiCl | $Li_2TeO_4$ | $ZrCl_4$ | — | 1.0 | 0.5 | 1.0 | — |
| Example 93 | LiCl | $Li_3SbO_4$ | $ZrCl_4$ | — | 0.5 | 0.5 | 1.0 | — |

TABLE 6-continued

| | Raw materials | | | | Fractions of raw materials blended (mole fractions) | | | |
|---|---|---|---|---|---|---|---|---|
| | Material I | Material II | Material III | Material IV | Material I | Material II | Material III | Material IV |
| Example 94 | LiCl | $Li_3BiO_4$ | $ZrCl_4$ | — | 0.5 | 0.5 | 1.0 | — |
| Example 95 | LiCl | $Li_2PtF_6$ | $ZrCl_4$ | — | 1.8 | 0.1 | 1.0 | — |
| Example 96 | LiCl | $Li_2PtFCl_6$ | $ZrCl_4$ | — | 1.8 | 0.1 | 1.0 | — |
| Example 97 | LiCl | $Li_2PtBr_6$ | $ZrCl_4$ | — | 1.8 | 0.1 | 1.0 | — |
| Example 98 | LiCl | $Li_2PtI_6$ | $ZrCl_4$ | — | 1.8 | 0.1 | 1.0 | — |
| Example 99 | LiCl | HCOOLi | $ZrCl_4$ | — | 1.5 | 0.5 | 1.0 | — |
| Example 100 | LiCl | $CH_3COOLi$ | $ZrCl_4$ | — | 1.5 | 0.5 | 1.0 | — |
| Comparative Example 1 | LiCl | — | $ZrCl_4$ | — | 2.0 | — | 1.0 | — |

TABLE 7

| | $A_aE_bG_cX_d$ $0.5 \leq a < 6, 0 < b < 2, 0.1 < c \leq 6$ and $0 \leq d \leq 6.1$ | | | | | | | | | | | Satisfaction of formula (1) | Solid electrolyte | Ionic conductivity (mS · $cm^{-1}$) | Reduction potential window (V vs. $Li/Li^+$) | Oxidation potential window (V vs. $Li/Li^+$) | Discharge energy (mWh) |
|---|---|---|---|---|---|---|---|---|---|---|---|---|---|---|---|---|---|
| | A | E | G | Valence of G | X | | | a | b | c | d | | | | | | |
| Example 1 | Li | Zr | $SO_4$ | −2 | Cl | — | — | 2.0 | 1.0 | 0.5 | 5.0 | ○ | $Li_2Zr(SO_4)_{0.5}Cl_5$ | 0.52 | 0.241 | 5.5> | 3.3 |
| Example 2 | Li | Zr | $SO_4$ | −2 | Cl | — | — | 2.0 | 1.0 | 1.0 | 4.0 | ○ | $Li_2ZrSO_4Cl_4$ | 0.26 | 0.030 | 7.0> | 3.8 |
| Example 3 | Li | Zr | $SO_4$ | −2 | Cl | — | — | 0.5 | 1.4 | 1.0 | 4.0 | ○ | $Li_{0.5}Zr_{1.375}SO_4Cl_4$ | 0.10 | 0.020 | 5.5> | 3.9 |
| Example 4 | Li | Zr | $SO_4$ | −2 | Cl | — | — | 2.0 | 1.0 | 1.5 | 3.0 | ○ | $Li_2Zr(SO_4)_{1.5}Cl_3$ | 0.015 | 0.010 | 5.5> | 3.6 |
| Example 5 | Li | Zr | $SO_4$ | −2 | Cl | — | — | 2.0 | 1.0 | 2.0 | 2.0 | ○ | $Li_2Zr(SO_4)_{2.0}Cl_2$ | 0.0006 | 0.005 | 5.5> | 3.5 |
| Example 6 | Li | Zr | $SO_4$ | −2 | Cl | — | — | 2.0 | 1.0 | 2.5 | 1.0 | ○ | $Li_2Zr(SO_4)_{2.5}Cl$ | 0.20 | 0.005 | 5.5 | 3.6 |
| Example 7 | Li | Zr | $SO_4$ | −2 | — | — | — | 2.0 | 1.0 | 3.0 | 0.0 | ○ | $Li_2Zr(SO_4)_{3.0}$ | 0.10 | 0.000 | 5.5 | 3.5 |
| Example 8 | Li | Zr | $SO_4$ | −2 | Cl | F | — | 2.0 | 1.0 | 1.0 | 4.0 | ○ | $Li_2ZrSO_4FCl_3$ | 0.22 | 0.010 | 5.5> | 3.5 |
| Example 9 | Li | Zr | $SO_4$ | −2 | Cl | Br | — | 2.0 | 1.0 | 1.0 | 4.0 | ○ | $Li_2ZrSO_4Cl_3Br$ | 0.24 | 0.050 | 5.5> | 3.7 |
| Example 10 | Li | Zr | $SO_4$ | −2 | Cl | I | — | 2.0 | 1.0 | 1.0 | 4.0 | ○ | $Li_2ZrSO_4Cl_3I$ | 0.23 | 0.020 | 5.5> | 3.6 |
| Example 11 | Li | Zr | $SO_4$ | −2 | Cl | — | — | 2.4 | 0.9 | 1.0 | 4.0 | ○ | $Li_{2.4}Zr_{0.9}SO_4Cl_4$ | 0.30 | 0.025 | 5.5> | 3.8 |
| Example 12 | Li | Zr | $SO_4$ | −2 | Cl | — | — | 2.8 | 0.8 | 1.0 | 4.0 | ○ | $Li_{2.8}Zr_{0.8}SO_4Cl_4$ | 0.27 | 0.020 | 5.5> | 3.9 |
| Example 13 | Li | Zr | $SO_4$ | −2 | Cl | — | — | 3.2 | 0.7 | 1.0 | 4.0 | ○ | $Li_{3.2}Zr_{0.7}SO_4Cl_4$ | 0.25 | 0.015 | 5.5> | 3.8 |
| Example 14 | Li, Cs | Zr | $SO_4$ | −2 | Cl | — | — | 2.4 | 0.9 | 1.0 | 4.0 | ○ | $Li_{2.3}Cs_{0.1}Zr_{0.9}SO_4Cl_4$ | 0.25 | 0.020 | 5.5> | 3.8 |
| Example 15 | Li, Cs | Zr | $SO_4$ | −2 | Cl | — | — | 2.8 | 0.8 | 1.0 | 4.0 | ○ | $Li_{2.6}Cs_{0.2}Zr_{0.8}SO_4Cl_4$ | 0.24 | 0.015 | 5.5> | 3.7 |
| Example 16 | Li, Cs | Zr | $SO_4$ | −2 | Cl | — | — | 3.2 | 0.7 | 1.0 | 4.0 | ○ | $Li_{2.9}Cs_{0.3}Zr_{0.7}SO_4Cl_4$ | 0.20 | 0.010 | 5.5> | 3.5 |

TABLE 8

| | $A_aE_bG_cX_d$ $0.5 \leq a < 6, 0 < b < 2, 0.1 < c \leq 6$ and $0 \leq d \leq 6.1$ | | | | | | | | | | | Satisfaction of formula (1) | Solid electrolyte | Ionic conductivity (mS · $cm^{-1}$) | Reduction potential window (V vs. $Li/Li^+$) | Oxidation potential window (V vs. $Li/Li^+$) | Discharge energy (mWh) |
|---|---|---|---|---|---|---|---|---|---|---|---|---|---|---|---|---|---|
| | A | E | G | Valence of G | X | | | a | b | c | d | | | | | | |
| Example 17 | Li, Cs | Zr | $SO_4$ | −2 | Cl | — | — | 2.4 | 0.9 | 1.0 | 4.0 | ○ | $Li_{2.2}Cs_{0.2}Zr_{0.9}SO_4Cl_4$ | 0.23 | 0.015 | 5.5> | 3.6 |

TABLE 8-continued

| | $A_aE_bG_cX_d$ 0.5 ≤ a < 6, 0 < b < 2, 0.1 < c ≤ 6 and 0 ≤ d ≤ 6.1 | | | | | | | | | | | Satisfaction of | Solid | Ionic conductivity | Reduction potential window | Oxidation potential window | Discharge |
|---|---|---|---|---|---|---|---|---|---|---|---|---|---|---|---|---|---|
| | A | E | G | Valence of G | X | | | a | b | c | d | formula (1) | electrolyte | (mS · $cm^{-1}$) | (V vs. $Li/Li^+$) | (V vs. $Li/Li^+$) | energy (mWh) |
| Example 18 | Li, Cs | Zr | $SO_4$ | −2 | Cl | — | — | 2.4 | 0.9 | 1.0 | 4.0 | ○ | $Li_{2.1}Cs_{0.3}Zr_{0.9}SO_4Cl_4$ | 0.20 | 0.010 | 5.5> | 3.7 |
| Example 19 | Li, Cs | Zr | $SO_4$ | −2 | Cl | — | — | 2.4 | 0.9 | 1.0 | 4.0 | ○ | $Li_{2.0}Cs_{0.4}Zr_{0.9}SO_4Cl_4$ | 0.18 | 0.005 | 5.5> | 3.9 |
| Example 20 | Li | Zr | $SO_4$ | −2 | Cl | — | — | 1.0 | 1.0 | 1.0 | 3.0 | ○ | $LiZrSO_4Cl_3$ | 0.03 | 0.018 | 5.5> | 3.5 |
| Example 21 | Li | Zr | $SO_3$ | −2 | Cl | — | — | 2.0 | 1.0 | 1.0 | 4.0 | ○ | $Li_2ZrSO_3Cl_4$ | 0.25 | 0.030 | 5.5> | 3.6 |
| Example 22 | Li | Zr | $SO_5$ | −2 | Cl | — | — | 2.0 | 1.0 | 1.0 | 4.0 | ○ | $Li_2ZrSO_5Cl_4$ | 0.28 | 0.025 | 5.5> | 3.6 |
| Example 23 | Li | Zr | $S_2O_3$ | −2 | Cl | — | — | 2.0 | 1.0 | 1.0 | 4.0 | ○ | $Li_2ZrS_2O_3Cl_4$ | 0.30 | 0.020 | 5.5> | 3.5 |
| Example 24 | Li | Zr | $S_2O_4$ | −2 | Cl | — | — | 2.0 | 1.0 | 1.0 | 4.0 | ○ | $Li_2ZrS_2O_4Cl_4$ | 0.31 | 0.020 | 5.5> | 3.6 |
| Example 25 | Li | Zr | $S_2O_5$ | −2 | Cl | — | — | 2.0 | 1.0 | 1.0 | 4.0 | ○ | $Li_2ZrS_2O_5Cl_4$ | 0.28 | 0.020 | 5.5> | 3.8 |
| Example 26 | Li | Zr | $S_2O_6$ | −1 | Cl | — | — | 2.0 | 1.0 | 1.0 | 5.0 | ○ | $Li_2ZrS_2O_6Cl_5$ | 0.25 | 0.020 | 5.5> | 3.8 |
| Example 27 | Li | Zr | $S_2O_7$ | −1 | Cl | — | — | 2.0 | 1.0 | 1.0 | 5.0 | ○ | $Li_2ZrS_2O_7Cl_5$ | 0.20 | 0.015 | 5.5> | 3.5 |
| Example 28 | Li | Zr | $S_2O_8$ | −3 | Cl | — | — | 2.0 | 1.0 | 1.0 | 3.0 | ○ | $Li_2ZrS_2O_8Cl_3$ | 0.18 | 0.015 | 5.5> | 3.5 |
| Example 29 | Li | Zr | OH | −1 | Cl | — | — | 2.0 | 1.0 | 1.0 | 5.0 | ○ | $Li_2ZrOHCl_5$ | 0.36 | 0.059 | 5.5> | 3.6 |
| Example 30 | Li | Zr | OH | −1 | Cl | — | — | 2.0 | 1.0 | 2.0 | 4.0 | ○ | $Li_2Zr(OH)_2Cl_4$ | 0.0029 | 0.010 | 5.5> | 3.6 |
| Example 31 | Li | Zr | $BO_2$ | −1 | Cl | — | — | 2.0 | 1.0 | 1.0 | 5.0 | ○ | $Li_2ZrBO_2Cl_5$ | 0.40 | 0.267 | 5.5> | 3.0 |
| Example 32 | Li | Zr | $BO_3$ | −3 | Cl | — | — | 2.0 | 1.0 | 1.0 | 3.0 | ○ | $Li_2ZrBO_3Cl_3$ | 0.26 | 0.050 | 5.5> | 3.8 |

TABLE 9

| | $A_aE_bG_cX_d$ 0.5 ≤ a < 6, 0 < b < 2, 0.1 < c ≤ 6 and 0 ≤ d ≤ 6.1 | | | | | | | | | | | Satisfaction of | Solid | Ionic conductivity | Reduction potential window | Oxidation potential window | Discharge |
|---|---|---|---|---|---|---|---|---|---|---|---|---|---|---|---|---|---|
| | A | E | G | Valence of G | X | | | a | b | c | d | formula (1) | electrolyte | (mS · $cm^{-1}$) | (V vs. $Li/Li^+$) | (V vs. $Li/Li^+$) | energy (mWh) |
| Example 33 | Li | Zr | $BO_4$ | −5 | Cl | — | — | 2.0 | 1.0 | 1.0 | 1.0 | ○ | $Li_2ZrBO_4Cl$ | 0.27 | 0.040 | 5.5> | 3.8 |
| Example 34 | Li | Zr | $B_3O_6$ | −3 | Cl | — | — | 2.0 | 1.0 | 1.0 | 3.0 | ○ | $Li_2ZrB_3O_6Cl_3$ | 0.24 | 0.040 | 5.5> | 3.8 |
| Example 35 | Li | Zr | $B_4O_7$ | −2 | Cl | — | — | 2.0 | 1.0 | 1.0 | 4.0 | ○ | $Li_2Zr(B_4O_7)_{0.5}Cl_5$ | 0.27 | 0.099 | 5.5> | 3.6 |
| Example 36 | Li | Zr | $CO_3$ | −2 | Cl | — | — | 2.0 | 1.0 | 0.5 | 5.0 | ○ | $Li_2Zr(CO_3)_{0.5}Cl_5$ | 0.32 | 0.287 | 5.5> | 2.8 |
| Example 37 | Li | Zr | $CO_3$ | −2 | Cl | — | — | 2.0 | 1.0 | 1.0 | 4.0 | ○ | $Li_2ZrCO_3Cl_4$ | 0.56 | 0.260 | 5.5> | 2.9 |
| Example 38 | Li | Zr | $CO_3$ | −2 | Cl | — | — | 2.0 | 1.0 | 1.0 | 3.0 | ○ | $Li_2Zr(CO_3)_{1.5}Cl_3$ | 0.23 | 0.200 | 5.5> | 3.2 |
| Example 39 | Li | Zr | $CO_3$ | −2 | Cl | — | — | 2.0 | 1.0 | 2.0 | 2.0 | ○ | $Li_2Zr(CO_3)_{2.0}Cl_2$ | 0.17 | 0.180 | 5.5> | 3.4 |
| Example 40 | Li | Zr | $CO_3$ | −2 | Cl | — | — | 2.0 | 1.0 | 2.5 | 1.0 | ○ | $Li_2Zr(CO_3)_{2.5}Cl$ | 0.14 | 0.120 | 5.5> | 3.6 |
| Example 41 | Li | Zr | $CO_3$ | −2 | Cl | — | — | 2.0 | 1.0 | 3.0 | 0.0 | ○ | $Li_2Zr(CO_3)_3$ | 0.10 | 0.050 | 5.5> | 3.7 |
| Example 42 | Li | Zr | $NO_3$ | −1 | Cl | — | — | 2.0 | 1.0 | 1.0 | 5.0 | ○ | $Li_2ZrNO_3Cl_5$ | 0.26 | 0.200 | 5.5> | 3.3 |
| Example 43 | Li | Zr | $NO_3$ | −1 | Cl | — | — | 2.0 | 1.0 | 2.0 | 4.0 | ○ | $Li_2Zr(NO_3)_2Cl_4$ | 0.23 | 0.170 | 5.5> | 3.6 |
| Example 44 | Li | Zr | $AlO_2$ | −1 | Cl | — | — | 2.0 | 1.0 | 1.0 | 5.0 | ○ | $Li_2ZrAlO_2Cl_5$ | 0.25 | 0.050 | 5.5> | 3.8 |

TABLE 9-continued

| | A | E | G | Valence of G | X | | | a | b | c | d | Satisfaction of formula (1) | Solid electrolyte | Ionic conductivity (mS · $cm^{-1}$) | Reduction potential window (V vs. $Li/Li^+$) | Oxidation potential window (V vs. $Li/Li^+$) | Discharge energy (mWh) |
|---|---|---|---|---|---|---|---|---|---|---|---|---|---|---|---|---|---|
| | $A_aE_bG_cX_d$ $0.5 \le a < 6, 0 < b < 2, 0.1 < c \le 6$ and $0 \le d \le 6.1$ | | | | | | | | | | | | | | | | |
| Example 45 | Li | Zr | $SiO_3$ | −2 | Cl | — | — | 2.0 | 1.0 | 1.0 | 4.0 | ○ | $Li_2ZrSiO_3Cl_4$ | 0.24 | 0.040 | 5.5> | 3.7 |
| Example 46 | Li | Zr | $SiO_4$ | −4 | Cl | — | — | 2.0 | 1.0 | 1.0 | 2.0 | ○ | $Li_2ZrSiO_4Cl_2$ | 0.20 | 0.030 | 5.5> | 3.7 |

TABLE 10

| | A | E | G | Valence of G | X | | | a | b | c | d | Satisfaction of formula (1) |
|---|---|---|---|---|---|---|---|---|---|---|---|---|
| | $A_aE_bG_cX_d$ $0.5 \le a < 6, 0 < b < 2, 0.1 < c \le 6$ and $0 \le d \le 6.1$ | | | | | | | | | | | |
| Example 47 | Li | Zr | $Si_2O_7$ | −6 | — | — | — | 2.0 | 1.0 | 1.0 | 0.0 | ○ |
| Example 48 | Li | Zr | $Si_3O_9$ | −6 | — | — | — | 2.0 | 1.0 | 1.0 | 0.0 | ○ |
| Example 49 | Li | Zr | $Si_4O_{11}$ | −6 | — | — | — | 2.0 | 1.0 | 1.0 | 0.0 | ○ |
| Example 50 | Li | Zr | $Si_6O_{18}$ | −12 | — | — | — | 2.0 | 1.0 | 0.5 | 0.0 | ○ |
| Example 51 | Li | Zr | $PO_3$ | −1 | Cl | — | — | 2.0 | 1.0 | 1.0 | 5.0 | ○ |
| Example 52 | Li | Zr | $PO_4$ | −3 | Cl | — | — | 2.0 | 1.0 | 1.0 | 3.0 | ○ |
| Example 53 | Li | Al, Zr | $PO_4$ | −3 | Cl | — | — | 1.3 | 1.0 | 0.43 | 3.7 | ○ |
| Example 54 | Li, Ca | Zr | $PO_4$ | −3 | Cl | — | — | 1.3 | 0.9 | 0.4 | 3.8 | ○ |
| Example 55 | Li, Ca | Zr | $PO_4$ | −3 | F | Cl | — | 1.3 | 0.9 | 0.4 | 3.4 | ○ |
| Example 56 | Li | Al, Zr | $PO_4$ | −3 | F | Cl | — | 1.1 | 1.0 | 0.37 | 3.6 | ○ |
| Example 57 | Li | Y, Zr | $PO_4$ | −3 | Cl | — | — | 1.1 | 1.0 | 0.37 | 3.9 | ○ |
| Example 58 | Li | Zr | $P_2O_3$ | −4 | Cl | — | — | 2.0 | 1.0 | 1.0 | 2.0 | ○ |
| Example 59 | Li | Zr | $P_2O_7$ | −4 | Cl | — | — | 2.0 | 1.0 | 1.0 | 2.0 | ○ |
| Example 60 | Li | Zr | $P_3O_{10}$ | −5 | Cl | — | — | 2.0 | 1.0 | 1.0 | 1.0 | ○ |

| | Solid electrolyte | Ionic conductivity (mS · $cm^{-1}$) | Reduction potential window (V vs. $Li/Li^+$) | Oxidation potential window (V vs. $Li/Li^+$) | Discharge energy (mWh) |
|---|---|---|---|---|---|
| Example 47 | $Li_2ZrSi_2O_7$ | 0.10 | 0.030 | 5.5> | 3.6 |
| Example 48 | $Li_2ZrSi_3O_9$ | 0.09 | 0.032 | 5.5> | 3.6 |
| Example 49 | $Li_2ZrSi_4O_{11}$ | 0.08 | 0.033 | 5.5> | 3.5 |
| Example 50 | $Li_2Zr(Si_6O_{18})_{0.5}$ | 0.05 | 0.034 | 5.5> | 3.7 |
| Example 51 | $Li_2ZrPO_3Cl_5$ | 0.12 | 0.297 | 5.5> | 3.1 |
| Example 52 | $Li_2Zr(PO_4)_{0.5}Cl_{4.5}$ | 0.22 | 0.000 | 5.5> | 4.0 |
| Example 53 | $Li_{1.3}Al_{0.3}Zr_{0.7}(PO_4)_{0.43}Cl_{3.7}$ | 1.2 | 0.280 | 5.5> | 3.1 |
| Example 54 | $Li_{1.2}Ca_{0.1}Zr_{0.9}(PO_4)_{0.4}Cl_{3.8}$ | 0.91 | 0.293 | 5.5> | 2.9 |
| Example 55 | $Li_{1.2}Ca_{0.1}Zr_{0.9}(PO_4)_{0.4}F_{0.4}Cl_{3.4}$ | 0.52 | 0.252 | 5.5> | 3.2 |

TABLE 10-continued

| | | | | | |
|---|---|---|---|---|---|
| Example 56 | $Li_{1.1}Al_{0.1}Zr_{0.9}(PO_4)_{0.37}F_{0.3}Cl_{3.6}$ | 0.61 | 0.274 | 5.5> | 3.2 |
| Example 57 | $Li_{1.1}Y_{0.1}Zr_{0.9}(PO_4)_{0.37}Cl_{3.9}$ | 1.3 | 0.227 | 5.5> | 3.3 |
| Example 58 | $Li_2ZrP_2O_3Cl_2$ | 0.23 | 0.020 | 5.5> | 3.6 |
| Example 59 | $Li_2ZrP_2O_7Cl_2$ | 0.20 | 0.018 | 5.5> | 3.5 |
| Example 60 | $Li_2ZrP_3O_{10}Cl$ | 0.19 | 0.015 | 5.5> | 3.6 |

TABLE 11

| | $A_aE_bG_cX_d$ $0.5 \leq a < 6$, $0 < b < 2$, $0.1 < c \leq 6$ and $0 \leq d \leq 6.1$ | | | | | | | | | | | Satisfaction of formula |
|---|---|---|---|---|---|---|---|---|---|---|---|---|
| | A | E | G | Valence of G | X | | | a | b | c | d | (1) |
| Example 61 | Li | Al | $SO_4$ | −2 | Cl | — | — | 3.0 | 1.0 | 1.0 | 4.0 | ○ |
| Example 62 | Li | Sc | $SO_4$ | −2 | Cl | — | — | 3.0 | 1.0 | 1.0 | 4.0 | ○ |
| Example 63 | Li | Y | $SO_4$ | −2 | Cl | — | — | 3.0 | 1.0 | 1.0 | 4.0 | ○ |
| Example 64 | Li | Y | $SO_4$ | −2 | Cl | — | — | 5.7 | 0.1 | 1.0 | 4.0 | ○ |
| Example 65 | Li | Hf | $SO_4$ | −2 | Cl | — | — | 2.0 | 1.0 | 1.0 | 4.0 | ○ |
| Example 66 | Li | La | $SO_4$ | −2 | Cl | — | — | 3.0 | 1.0 | 1.0 | 4.0 | ○ |
| Example 67 | Li | Zr | $BF_4$ | −1 | Cl | — | — | 2.0 | 1.0 | 0.5 | 5.5 | ○ |
| Example 68 | Li | Zr | $PF_6$ | −1 | Cl | — | — | 2.0 | 1.0 | 0.1 | 5.9 | ○ |
| Example 69 | Li | Zr | BOB | −1 | Cl | — | — | 2.0 | 1.0 | 0.1 | 5.9 | ○ |
| Example 70 | Li | Zr | $(COO)_2$ | −2 | Cl | — | — | 2.0 | 1.0 | 0.25 | 5.5 | ○ |
| Example 71 | Li | Zr | $(COO)_2$ | −2 | Cl | — | — | 2.0 | 1.0 | 0.5 | 5.0 | ○ |
| Example 72 | Li | Zr | N | −3 | Cl | — | — | 2.0 | 1.0 | 0.1 | 5.9 | ○ |
| Example 73 | Li | Zr | N | −3 | Cl | — | — | 2.0 | 1.0 | 0.1 | 5.7 | ○ |
| Example 74 | Li | Zr | N | −3 | Cl | — | — | 2.0 | 1.0 | 0.3 | 5.0 | ○ |
| Example 75 | Li | Zr | $AlCl_4$ | −1 | Cl | — | — | 2.0 | 1.0 | 1.0 | 5.0 | ○ |
| Example 76 | Li | Zr | $AlCl_4$ | −1 | Cl | — | — | 2.0 | 1.0 | 1.5 | 4.5 | ○ |
| Example 77 | Li | Zr | $CF_3SO_3$ | −1 | Cl | — | — | 2.0 | 1.0 | 0.1 | 5.9 | ○ |
| Example 78 | Li | Zr | $CH_3COO$ | −1 | Cl | — | — | 2.0 | 1.0 | 0.1 | 5.9 | ○ |
| Example 79 | Li | Zr | $CF_3COO$ | −1 | Cl | — | — | 2.0 | 1.0 | 0.1 | 5.9 | ○ |

| | Solid electrolyte | Ionic conductivity ($mS \cdot cm^{-1}$) | Reduction potential window (V vs. $Li/Li^+$) | Oxidation potential window (V vs. $Li/Li^+$) | Discharge energy (mWh) |
|---|---|---|---|---|---|
| Example 61 | $Li_3AlSO_4Cl_4$ | 0.26 | 0.020 | 5.5> | 3.8 |
| Example 62 | $Li_3ScSO_4Cl_4$ | 0.24 | 0.010 | 5.5> | 3.7 |
| Example 63 | $Li_3YSO_4Cl_4$ | 0.23 | 0.050 | 5.5> | 3.6 |
| Example 64 | $Li_{5.7}Y_{0.1}SO_4Cl_4$ | 0.10 | 0.010 | 5.5> | 3.5 |
| Example 65 | $Li_2HfSO_4Cl_4$ | 0.30 | 0.010 | 5.5> | 3.8 |

TABLE 11-continued

| | | | | | |
|---|---|---|---|---|---|
| Example 66 | $Li_5LaSO_4Cl_4$ | 0.22 | 0.023 | 5.5> | 3.6 |
| Example 67 | $Li_2Zr(BF_4)_{0.5}Cl_{5.5}$ | 0.12 | 0.276 | 5.5> | 3.3 |
| Example 68 | $Li_2Zr(PF_6)_{0.1}Cl_{5.9}$ | 0.24 | 0.106 | 5.5> | 3.6 |
| Example 69 | $Li_2Zr(BOB)_{0.1}Cl_{5.9}$ | 0.29 | −0.100 | 5.5> | 4.0 |
| Example 70 | $Li_2Zr((COO)_2)_{0.25}Cl_{5.5}$ | 0.25 | 0.036 | 5.5> | 3.8 |
| Example 71 | $Li_2Zr((COO)_2)_{0.5}Cl_5$ | 0.11 | 0.033 | 5.5> | 3.7 |
| Example 72 | $Li_2ZrN_{0.05}Cl_{5.85}$ | 0.76 | 0.301 | 5.5> | 2.9 |
| Example 73 | $Li_2ZrN_{0.1}Cl_{5.7}$ | 1.2 | 0.275 | 5.5> | 3.1 |
| Example 74 | $Li_2ZrN_{0.333}Cl_5$ | 0.18 | 0.000 | 5.5> | 3.5 |
| Example 75 | $Li_2Zr(AlCl_4)Cl_5$ | 0.41 | −0.100 | 5.5> | 4.0 |
| Example 76 | $Li_2Zr(AlCl_4)_{1.5}Cl_{5.5}$ | 0.13 | −0.100 | 5.5> | 3.9 |
| Example 77 | $Li_2Zr(CF_3SO_3)_{0.1}Cl_{5.9}$ | 0.30 | 0.285 | 5.5> | 3.0 |
| Example 78 | $Li_2Zr(CH_3COO)_{0.1}Cl_{5.9}$ | 0.25 | 0.050 | 5.5> | 3.5 |
| Example 79 | $Li_2Zr(CF_3COO)_{0.1}Cl_{5.9}$ | 0.40 | 0.150 | 5.5> | 3.5 |

TABLE 12

| | $A_aE_bG_cX_d$ $0.5 \leq a < 6$, $0 < b < 2$, $0.1 < c \leq 6$ and $0 \leq d \leq 6.1$ | | | | | | | | | | | Satisfaction of formula |
|---|---|---|---|---|---|---|---|---|---|---|---|---|
| | A | E | G | Valence of G | X | | | a | b | c | d | (1) |
| Example 80 | Li | Zr | Succinate | −2 | Cl | — | — | 2.0 | 1.0 | 0.1 | 5.9 | ○ |
| Example 81 | Li | Zr | Malonate | −2 | Cl | — | — | 2.0 | 1.0 | 0.1 | 5.9 | ○ |
| Example 82 | Li | Zr | Tartrate | −2 | Cl | — | — | 2.0 | 1.0 | 0.1 | 5.9 | ○ |
| Example 83 | Li | Zr | Malate | −2 | Cl | — | — | 2.0 | 1.0 | 0.1 | 5.9 | ○ |
| Example 84 | Li | Zr | Benzene sulfonate | −1 | Cl | — | — | 2.0 | 1.0 | 0.1 | 5.9 | ○ |
| Example 85 | Li | Zr | Fumarate | −2 | Cl | — | — | 2.0 | 1.0 | 0.1 | 5.9 | ○ |
| Example 86 | Li | Zr | Maleate | −2 | Cl | — | — | 2.0 | 1.0 | 0.1 | 5.9 | ○ |
| Example 87 | Li | Zr | Citrate | −1 | Cl | — | — | 2.0 | 1.0 | 0.1 | 5.9 | ○ |
| Example 88 | Li | Zr | $MnO_4$ | −2 | Cl | — | — | 2.0 | 1.0 | 1.0 | 4.0 | ○ |
| Example 89 | Li | Zr | $SeO_4$ | −2 | Cl | — | — | 2.0 | 1.0 | 1.0 | 4.0 | ○ |
| Example 90 | Li | Zr | $CrO_4$ | −2 | Cl | — | — | 2.0 | 1.0 | 1.0 | 4.0 | ○ |
| Example 91 | Li | Zr | $AsO_4$ | −3 | Cl | — | — | 2.0 | 1.0 | 0.5 | 4.5 | ○ |
| Example 92 | Li | Zr | $TeO_4$ | −2 | Cl | — | — | 2.0 | 1.0 | 0.5 | 5.0 | ○ |
| Example 93 | Li | Zr | $SbO_4$ | −3 | Cl | — | — | 2.0 | 1.0 | 0.5 | 4.5 | ○ |
| Example 94 | Li | Zr | $BiO_4$ | −3 | Cl | — | — | 2.0 | 1.0 | 0.5 | 4.5 | ○ |
| Example 95 | Li | Zr | $PtF_6$ | −2 | Cl | — | — | 2.0 | 1.0 | 0.1 | 5.8 | ○ |
| Example 96 | Li | Zr | $PtCl_6$ | −2 | Cl | — | — | 2.0 | 1.0 | 0.1 | 5.8 | ○ |
| Example 97 | Li | Zr | $PtBr_6$ | −2 | Cl | — | — | 2.0 | 1.0 | 0.1 | 5.8 | ○ |
| Example 98 | Li | Zr | $PtI_6$ | −2 | Cl | — | — | 2.0 | 1.0 | 0.1 | 5.8 | ○ |
| Example 99 | Li | Zr | HCOO | −1 | Cl | — | — | 2.0 | 1.0 | 0.5 | 5.5 | ○ |

TABLE 12-continued

| | | | | | | | | | | | | |
|---|---|---|---|---|---|---|---|---|---|---|---|---|
| Example 100 | Li | Zr | $CH_3COO$ | −1 | Cl | — | — | 2.0 | 1.0 | 0.5 | 5.5 | ○ |
| Comparative Example 1 | Li | Zr | — | — | Cl | — | — | 2.0 | 1.0 | 0.0 | 6.0 | X |

| | Solid electrolyte | Ionic conductivity (mS · $cm^{-1}$) | Reduction potential window (V vs. $Li/Li^+$) | Oxidation potential window (V vs. $Li/Li^+$) | Discharge energy (mWh) |
|---|---|---|---|---|---|
| Example 80 | $Li_2Zr(OOC(CH_2)_2COO)_{0.1}Cl_{5.9}$ | 0.23 | 0.040 | 5.5> | 3.4 |
| Example 81 | $Li_2Zr(OOCCH_2COO)_{0.1}Cl_{5.9}$ | 0.16 | 0.037 | 5.5> | 3.5 |
| Example 82 | $Li_2Zr(OOCCH(OH)CH(OH)COO)_{0.1}Cl_{5.9}$ | 0.22 | 0.033 | 5.5> | 3.5 |
| Example 83 | $Li_2Zr(OOCCH(OH)CH_2COO)_{0.1}Cl_{5.9}$ | 0.10 | 0.036 | 5.5> | 3.5 |
| Example 84 | $Li_2Zr(C_6H_5SO_3)_{0.1}Cl_{5.9}$ | 0.37 | 0.060 | 5.5> | 3.5 |
| Example 85 | $Li_2Zr(OOCCHCHCOO)_{0.1}Cl_{5.9}$ | 0.21 | 0.032 | 5.5> | 3.5 |
| Example 86 | $Li_2Zr(OOCCHCHCOO)_{0.1}Cl_{5.9}$ | 0.21 | 0.032 | 5.5> | 3.5 |
| Example 87 | $Li_2Zr(C(OH)(CH_2COOH)_2COO)_{0.1}Cl_{5.9}$ | 0.15 | 0.037 | 5.5> | 3.4 |
| Example 88 | $Li_2Zr(MnO_4)Cl_4$ | 0.33 | 0.031 | 5.5> | 3.6 |
| Example 89 | $Li_2Zr(SeO_4)Cl_4$ | 0.27 | 0.035 | 5.5> | 3.5 |
| Example 90 | $Li_2Zr(CrO_4)Cl_4$ | 0.31 | 0.038 | 5.5> | 3.6 |
| Example 91 | $Li_2Zr(AsO_4)_{0.5}Cl_{4.5}$ | 0.29 | 0.032 | 5.5> | 3.6 |
| Example 92 | $Li_2Zr(TeO_4)_{0.5}Cl_5$ | 0.35 | 0.037 | 5.5> | 3.5 |
| Exam ple 93 | $Li_2Zr(SbO_4)_{0.5}Cl_{4.5}$ | 0.31 | 0.040 | 5.5> | 3.3 |
| Example 94 | $Li_2Zr(BiO_4)_{0.5}Cl_{4.5}$ | 0.22 | 0.031 | 5.5> | 3.5 |
| Example 95 | $Li_2Zr(PtF_6)_{0.1}Cl_{5.8}$ | 0.20 | 0.030 | 5.5> | 3.6 |
| Example 96 | $Li_2Zr(PtCl_6)_{0.1}Cl_{5.8}$ | 0.35 | 0.033 | 5.5> | 3.5 |
| Example 97 | $Li_2Zr(PtBr_6)_{0.1}Cl_{5.8}$ | 0.22 | 0.040 | 5.5> | 3.6 |
| Example 98 | $Li_2Zr(PtI_6)_{0.1}Cl_{5.8}$ | 0.21 | 0.043 | 5.5> | 3.5 |
| Example 99 | $Li_2Zr(HCOO)_{0.5}Cl_{5.5}$ | 0.25 | 0.020 | 5.5> | 3.5 |
| Example 100 | $Li_2Zr(CH_3COO)_{0.5}Cl_{5.5}$ | 0.22 | 0.250 | 5.5> | 3.6 |
| Comparative Example 1 | $Li_2ZrCl_6$ | 0.28 | 0.433 | 5.5> | 0.7 |

[X-Ray Diffraction (XRD) Measurement]

X-ray diffraction measurement was performed on the solid electrolyte of Example 2 by a method to be described below using CuKα rays.

The solid electrolyte was loaded into a glass holder for XRD measurement in a glove box having a dew point of −99° C. and an oxygen concentration of 1 ppm in which argon gas was circulated. After that, the loaded surface was covered and sealed by pasting polyimide tape for moisture exclusion (tape dried in a vacuum at 70° C. for 16 hours) to prepare an XRD measurement specimen. Next, the XRD measurement specimen was taken out to the atmosphere, and XRD measurement was performed using an X-ray diffractometer (manufactured by Malvern Panalytical Ltd).

As an X-ray source, CuKα rays were used. The XRD measurement was performed at scanning angles (2θ) of 10 to 65 degrees, a tube voltage of 45 KV and a tube current of 40 mA.

Figure 2:
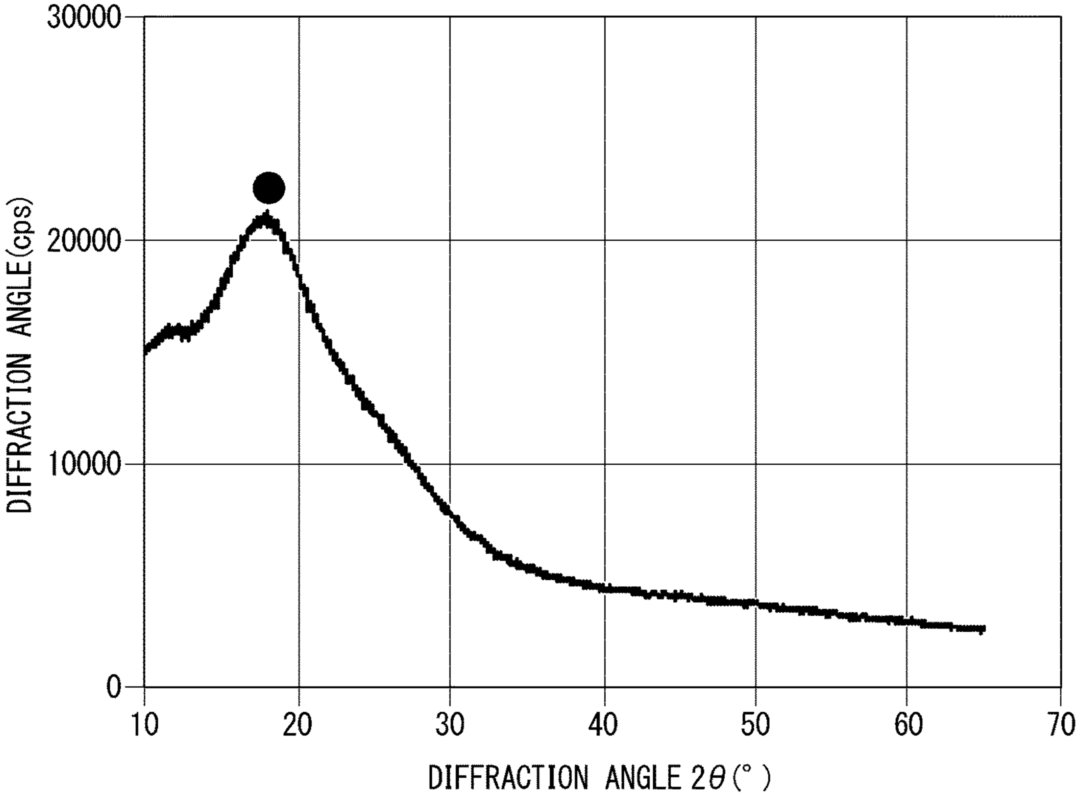
FIG. 2 is a chart showing the X-ray diffraction result of a solid electrolyte of Example 2.

FIG. 2 is a chart showing the X-ray diffraction result of the solid electrolyte of Example 2. "•" shown in FIG. 2 indicates a diffraction peak of the polyimide tape confirmed in the X-ray diffraction measurement.

As shown in FIG. 2, for the solid electrolyte of Example 2, no diffraction peak was observed in the X-ray diffraction measurement.

[Raman Spectroscopy]

Figure 3:
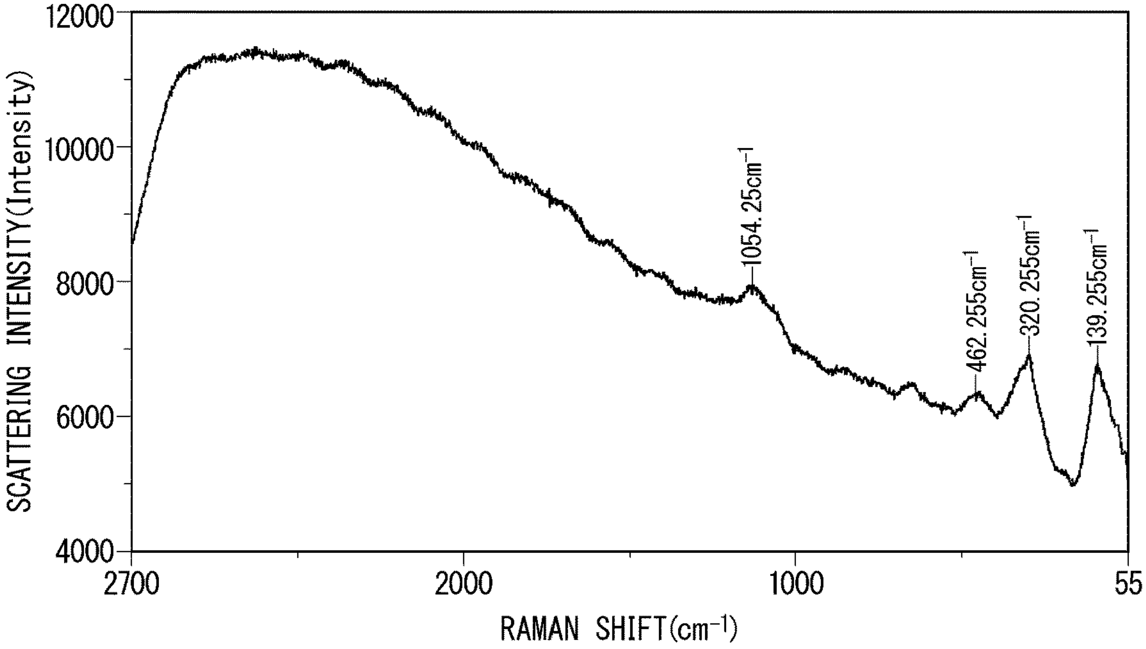
FIG. 3 is a Raman spectrum of the solid electrolyte of Example 2.

Raman spectroscopy was performed on the solid electrolyte of Example 2 by a method to be described below. The Raman spectroscopy was performed in an argon-substituted glove box in a state where a measurement specimen was sealed in a transparent sealed container to avoid contact with oxygen and moisture in the atmosphere. NRS-7100 (manufactured by JASCO Corporation) was used as a Raman spectrometer, and the measurement was performed at an excitation wavelength of 532.15 nm. FIG. 3 is a Raman spectrum of the solid electrolyte of Example 2. As shown in FIG. 3, a peak indicating the presence of $SO_4$ was observed at approximately 1054 $cm^1$.

[Electrochemical Measurement]

Electrochemical measurement was performed on each of the solid electrolytes of Example 1 to Example 100 and Comparative Example 1 by a method to be described below, and the oxidation potential window (V vs. $Li/Li^+$) and the reduction potential window (V vs. $Li/Li^+$) were each measured. The results are shown in Table 7 to Table 12.

A cylinder of a (polyether ether ketone (PEEK)) dice for pressure forming having a through hole with a diameter of 10 mm at the center and having a diameter of 30 mm and a height of 20 mm was prepared. Next, a lower punch having a diameter of 9.99 mm made of an alloy tool steel (SKD11) was inserted into the through hole of the cylinder from the lower side. In addition, 110 mg of a powder of the solid electrolyte was injected into the through hole of the cylinder from the upper side. After that, an upper punch having a diameter of 9.99 mm made of an alloy tool steel (SKD11) was inserted into the through hole of the cylinder from the upper side. In addition, the cylinder was mounted in a pressing machine, three tons of a load was applied between the upper punch and the lower punch, and the powder of the solid electrolyte was pressed (pressure-formed).

After that, the cylinder was removed from the pressing machine, the upper punch was removed from the cylinder, a metal foil (a platinum foil or a copper foil) was inserted into the cylinder as a working electrode having a diameter of 10 mm and a thickness of 100 m, and the upper punch was inserted again. As the upper punch, a punch having a terminal for electrochemical measurement attached to the side was used. Next, the cylinder was turned over, the lower punch was removed from the cylinder, an indium foil having a diameter of 10 mm and a thickness of 100 m, a lithium foil having a diameter of 10 mm and a thickness of 100 m and an indium foil having a diameter of 10 mm and a thickness of 100 m were inserted in this order into the cylinder, and the lower punch was inserted again. This is because an indium-lithium alloy is used as a counter electrode and a reference electrode. Alternatively, there are also cases where lithium is used as a counter electrode. In this case, the lower punch was removed from the cylinder, and then a lithium foil having a diameter of 10 mm and a thickness of 100 m was inserted into the cylinder. Which of a lithium-indium alloy or lithium to be used as the counter electrode and the reference electrode depends on the convenience of experiments. As the lower punch, a punch having a terminal for electrochemical measurement attached to the side was used. As a result, an electrochemical cell having In—Li/solid electrolyte/metal foil or Li/solid electrolyte/metal foil laminated in this order in the cylinder was formed.

In addition, two stainless steel sheets having a diameter of 50 mm and a thickness of 5 mm and two BAKELITE (registered trademark) sheets having a diameter of 50 mm and a thickness of 2 mm were prepared. Next, four holes for screws were provided in each of the two stainless steel sheets and the two BAKELITE (registered trademark) sheets. The holes for screws were provided at positions such that, when the electrochemical cell, the two stainless steel sheets and the two BAKELITE (registered trademark) sheets were to be laminated, the two stainless steel sheets and the two BAKELITE (registered trademark) sheets overlapped each other in a planar view but did not overlap the electrochemical cell in a planar view.

After that, the stainless-steel sheet, the BAKELITE (registered trademark) sheet, the electrochemical cell, the BAKELITE (registered trademark) sheet, and the stainless steel sheet were laminated in this order and tightened by inserting screws into the screw holes. A cell for electrochemical measurement in which the upper punch and the lower punch in the electrochemical cell were insulated by the BAKELITE (registered trademark) sheets was obtained.

Next, the cell for electrochemical measurement was put into a constant-temperature vessel (25° C.) and placed still for 48 hours under the application of a pressure of approximately 50 $kgf/cm^2$. As a result, the indium foil, the lithium foil and the indium foil in the cell for electrochemical measurement were integrated together, and a lithium-indium alloy was produced as a reference electrode. This is intended to produce a lithium-indium alloy using indium and lithium and to stabilize the open circuit voltage.

The counter electrode and the working electrode in the electrochemical measurement are a lithium-indium alloy or lithium. The potential of the lithium-indium alloy is 0.62 V (vs. $Li/Li^+$). Therefore, in the electrochemical measurement in the present specification, a value obtained by adding 0.62 V to the value of the potential obtained with respect to the lithium-indium alloy is used as the potential with respect to $Li/Li^+$. In addition, the reduction current is expressed as a negative value, and the oxidation current is expressed as a positive value.

The electrochemical measurement of the cell for electrochemical measurement was performed using an EC-Lab electrochemical measurement system VMP-300 manufactured by BioLogic Sciences Instruments. As the electrochemical measurement, cyclic voltammetry was performed. In the cyclic voltammetry as the electrochemical measurement, the scanning rate was set to 0.1 mV/sec, the working electrode was scanned down to −0.1 V (vs. $Li/Li^+$) in the reduction direction, and the working electrode was scanned up to 5.5 V (vs. $Li/Li^+$) in the oxidation direction. Here, in Example 2, the working electrode was scanned down to 0 V (vs. Li/Li) in the reduction direction, and the working electrode was scanned up to 7.0 V (vs. $Li/Li^+$) in the oxidation direction. In Example 20, the working electrode was scanned down to 0 V (vs. Li/Li) in the reduction direction, and the working electrode was scanned up to 5.5 V (vs. $Li/Li^+$) in the oxidation direction. The cyclic voltammetry was begun from the natural potential (approximately 3 V (vs. $Li/Li^+$)), the working electrode was scanned in the reduction direction and then scanned in the oxidation direction at the time of obtaining the reduction potential window, and the working electrode was scanned in the oxidation direction and then scanned in the reduction direction at the time of obtaining the oxidation potential window. The reason therefor is that, when the working electrode is scanned from the natural potential to 0 V (vs. $Li/Li^+$) or lower (that is, in the reduction direction) and then scanned in the oxidation direction, an oxidation current indicating the elution of lithium metal generated by reduction is generated. Therefore, the distinction between the oxidation current of the solid electrolyte and the oxidation current of the solution of the lithium metal becomes difficult. Therefore, at the time of obtaining the oxidation potential window of the solid electrolyte, the working electrode was scanned in the oxidation direction from the natural potential (approximately 3 V (vs. $Li/Li^+$)) and then scanned in the reduction direction as described above.

In the present specification, the oxidation potential window and the reduction potential window of the solid electrolyte are the following potentials measured by the electrochemical measurement of the cell for electrochemical measurement, respectively.

(Reduction Potential Window)

When the potential of the working electrode was swept in the reduction direction from the natural potential (approximately 3 V (vs. $Li/Li^+$)), a potential at which the reduction current ($\mu A/cm^2$) of the working electrode per area became $-20$ $\mu A/cm^2$ or less (a value having an absolute value of 20 $\mu A/cm^2$ or more with a negative reference sign) was regarded as the reduction potential window.

(Oxidation Potential Window)

When the potential of the working electrode was swept in the oxidation direction from the natural potential (approximately 3 V (vs. $Li/Li^+$)), a potential at which the oxidation current ($\mu A/cm^2$) of the working electrode per area became 20 $\mu A/cm^2$ or more (a value having an absolute value of 20 $\mu A/cm^2$ or more with a positive reference sign) was regarded as the oxidation potential window.

The cyclic voltammograms of the solid electrolytes of Example 2, Example 20, Example 29, Example 37, Example 71 and Comparative Example 1 obtained by the electrochemical measurement are shown in FIG. 4 to FIG. 10.

Figure 4:
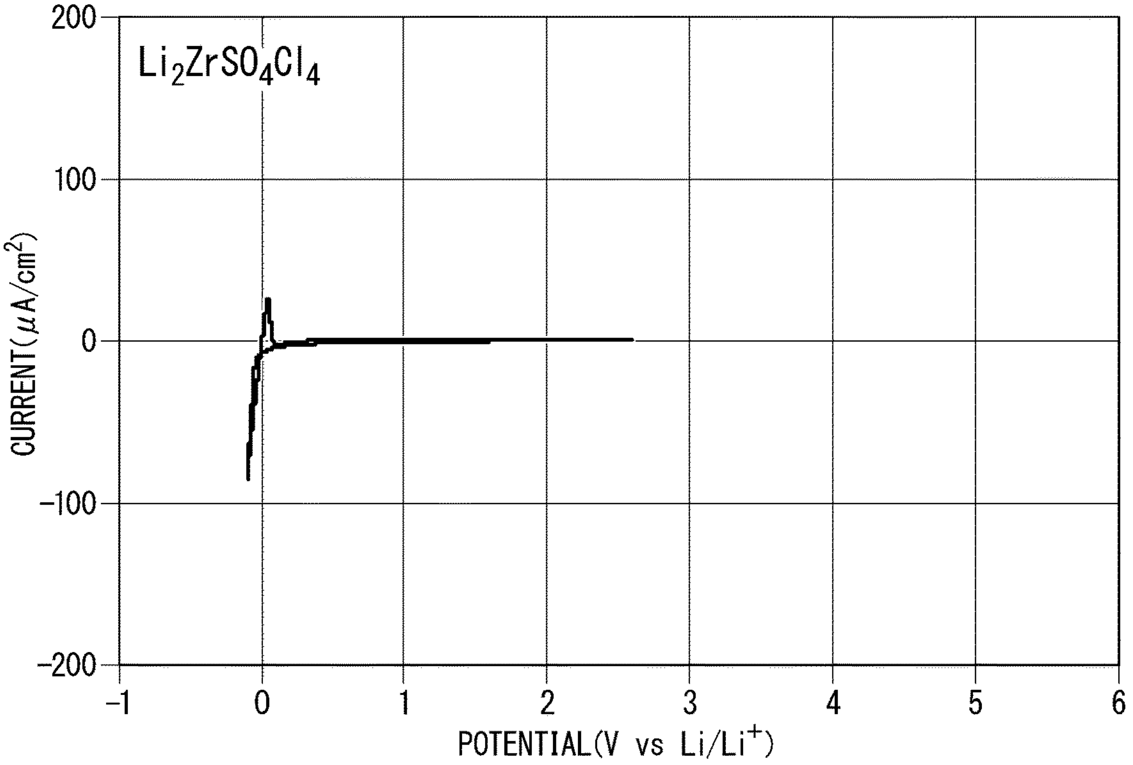
FIG. 4 is a cyclic voltammogram of the solid electrolyte of Example 2 which is a case where a copper foil is used as a working electrode.
Figure 5:
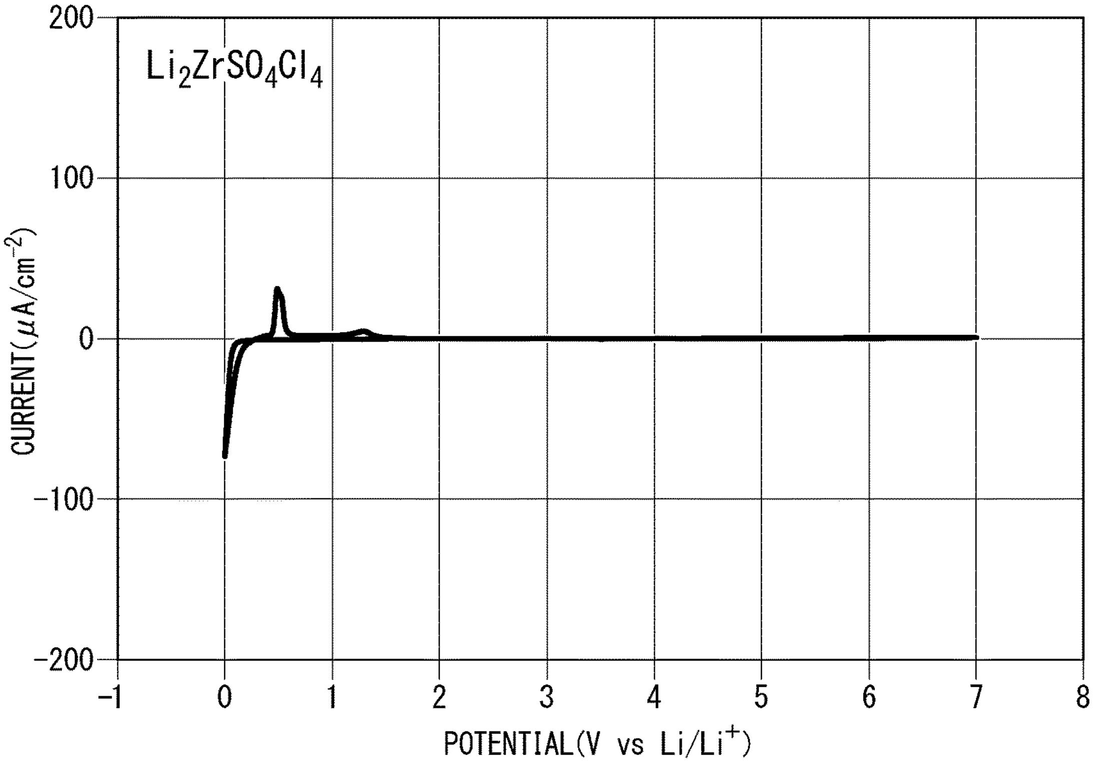
FIG. 5 is a cyclic voltammogram of the solid electrolyte of Example 2 which is a case where a platinum foil is used as a working electrode.
Figure 6:
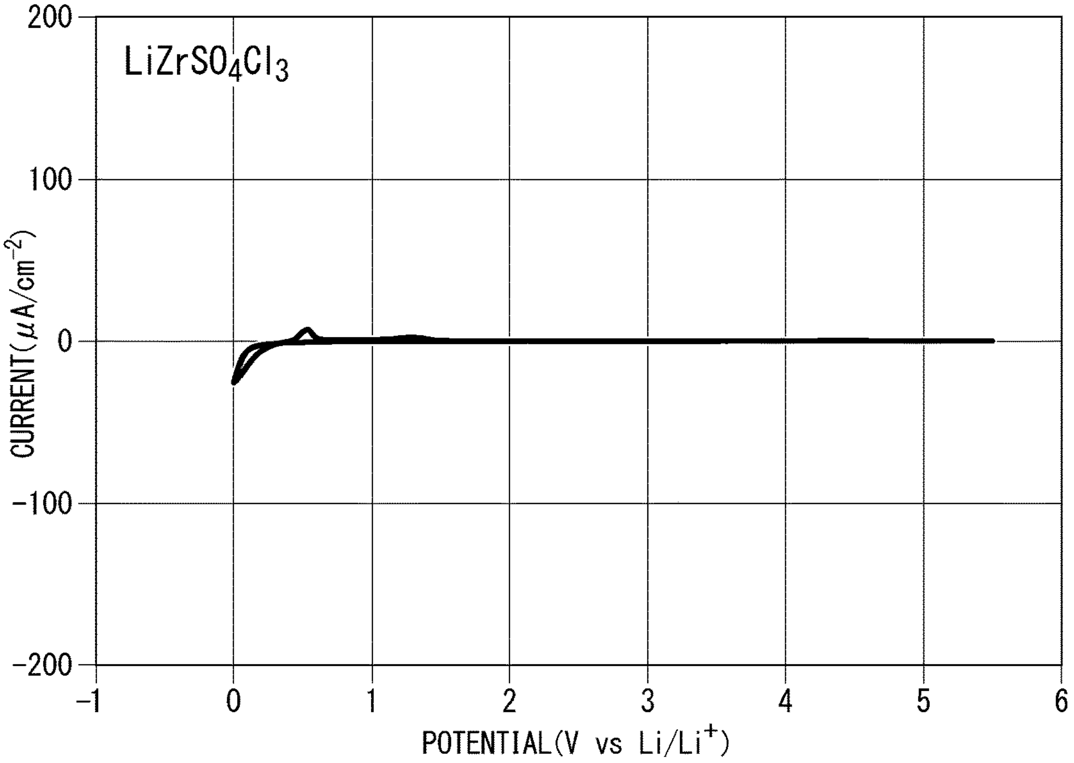
FIG. 6 is a cyclic voltammogram of a solid electrolyte of Example 20 which is a case where a platinum foil is used as a working electrode.
Figure 7:
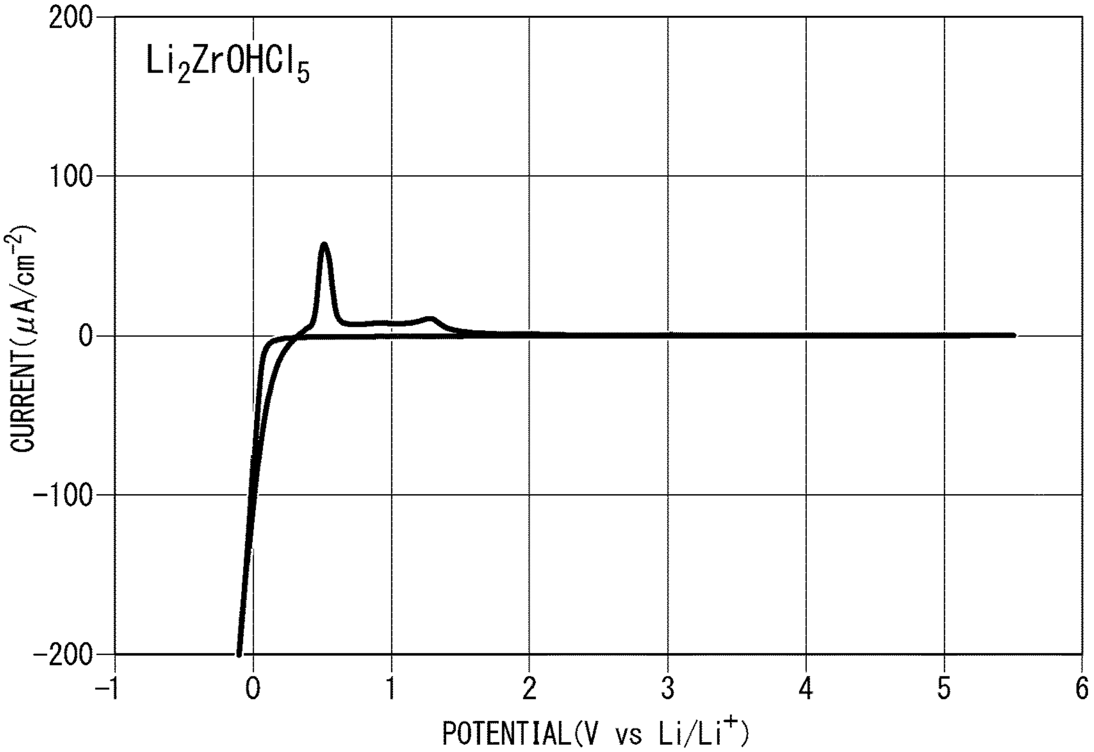
FIG. 7 is a cyclic voltammogram of a solid electrolyte of Example 29 which is a case where a platinum foil is used as a working electrode.
Figure 8:
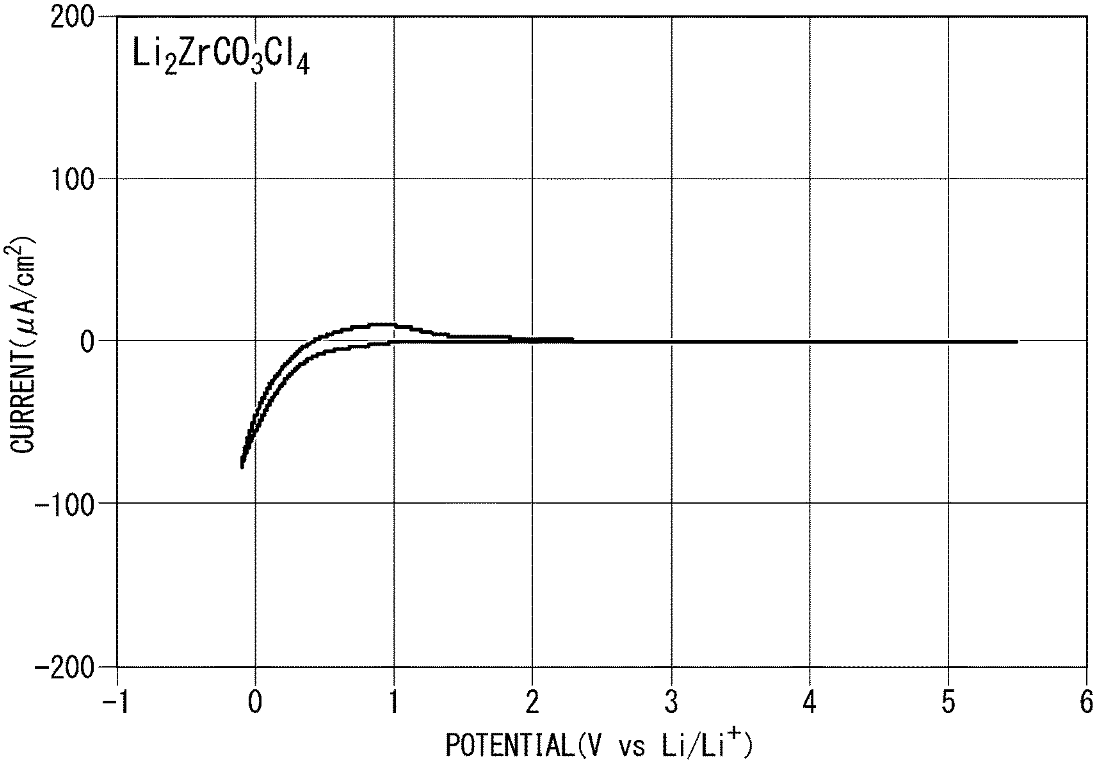
FIG. 8 is a cyclic voltammogram of a solid electrolyte of Example 37 which is a case where a platinum foil is used as a working electrode.
Figure 9:
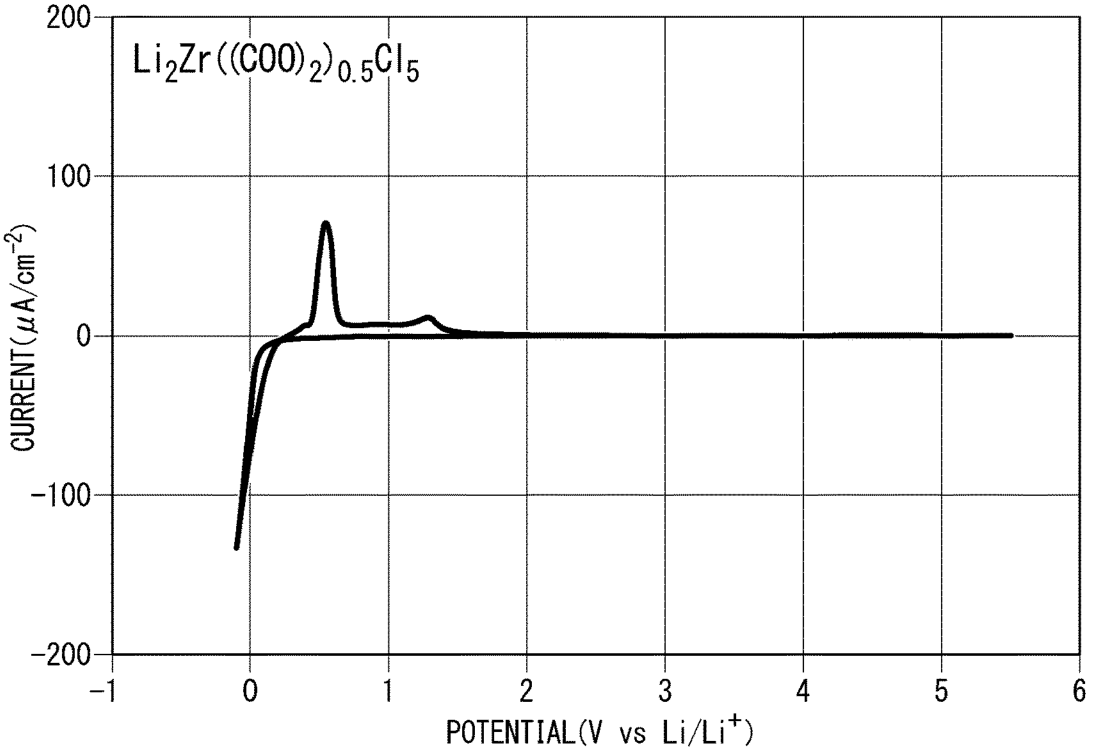
FIG. 9 is a cyclic voltammogram of a solid electrolyte of Example 71 which is a case where a platinum foil is used as a working electrode.
Figure 10:
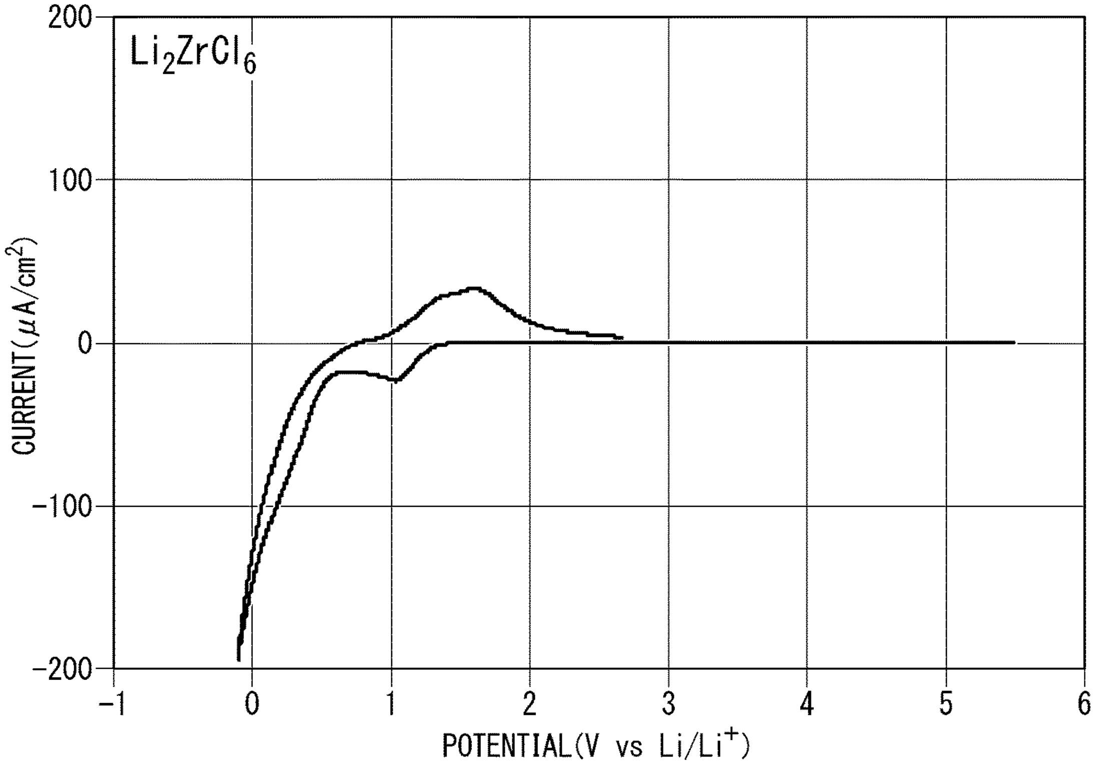
FIG. 10 is a cyclic voltammogram of a solid electrolyte of Comparative Example 1 which is a case where a platinum foil is used as a working electrode.

FIG. 4 is the cyclic voltammogram of the solid electrolyte of Example 2 which is a case where a copper foil was used as the working electrode. FIG. 5 is the cyclic voltammogram of the solid electrolyte of Example 2 which is a case where a platinum foil was used as the working electrode. In addition, FIG. 6 is the cyclic voltammogram of the solid electrolyte of Example 20 which is a case where a platinum foil was used as the working electrode. FIG. 7 is the cyclic voltammogram of the solid electrolyte of Example 29 which is a case where a platinum foil was used as the working electrode. FIG. 8 is the cyclic voltammogram of the solid electrolyte of Example 37 which is a case where a platinum foil was used as the working electrode. FIG. 9 is the cyclic voltammogram of the solid electrolyte of Example 71 which is a case where a platinum foil was used as the working electrode. FIG. 10 is the cyclic voltammogram of the solid electrolyte of Comparative Example 1 which is a case where a platinum foil was used as the working electrode.

The composition of the solid electrolyte of Example 2 is $Li_2ZrSO_4Cl_4$. As shown in FIG. 4, in the cyclic voltammogram of the solid electrolyte of Example 2 which is a case where a copper foil was used as the working electrode, at a potential near 0 V (vs. Li/Li), a peak of a reduction current (negative current) indicating the reduction of a lithium ion and the deposition of lithium metal was observed. In addition, as shown in FIG. 4, at a potential near 0 V (vs. $Li/Li^+$), a peak of an oxidation current (positive current) indicating the oxidation and dissolution of lithium metal was observed. As shown in FIG. 4, except those, neither a peak of a large reduction current of $-20$ $\mu A/cm^2$ or less nor a peak of a large oxidation current of 20 $\mu A/cm^2$ or more was observed.

As shown in FIG. 5, in the cyclic voltammogram of the solid electrolyte of Example 2 which is a case where a platinum foil was used as the working electrode, at a potential near 0 V (vs. Li/Li), a peak of a reduction current indicating an alloying reaction of a lithium ion with platinum was observed. In addition, as shown in FIG. 5, at a potential near 0.5 to 1.5 V (vs. $Li/Li^+$), three peaks of oxidation currents indicating the dissolution of lithium from an alloy of lithium and platinum and the generation of a lithium ion were observed. As shown in FIG. 5, except those, neither a peak of a large reduction current of $-20$ $\mu A/cm^2$ or less nor a peak of a large oxidation current of 20 $\mu A/cm^2$ or more was observed. The reduction and oxidation potential windows were 0.030 V (vs. $Li/Li^+$) and 7.0 V (vs. $Li/Li^+$) or higher, respectively. Since a potential at which the charging of graphite begins is approximately 0.21 V (vs. $Li/Li^+$) (J. Electrochem. Soc. Vol. 140, No. 9, pp. 2490, FIG. 15), while the value is measured in an electrolytic solution, a reduction potential window of 0.030 V (vs. $Li/Li^+$) was a potential low enough to charge graphite.

The composition of the solid electrolyte of Example 20 is $LiZrSO_4Cl_3$. As shown in FIG. 6, neither a large reduction current of $-20$ $\mu A/cm^2$ or less nor a peak of a large oxidation current of 20 $\mu A/cm^2$ or more was observed. The reduction and oxidation potential windows were 0.018 V (vs. $Li/Li^+$) and 5.5 V (vs. $Li/Li^+$) or higher, respectively. A reduction potential window of 0.018 V (vs. Li/Li) was a potential low enough to charge graphite.

The composition of the solid electrolyte of Example 29 is $Li_2ZrOHCl_5$. As shown in FIG. 7, in the cyclic voltammogram of the solid electrolyte of Example 29 which is a case where a platinum foil was used as the working electrode, at a potential near 0 V (vs. Li/Li), a peak of a reduction current indicating an alloying reaction of a lithium ion with platinum was observed. In addition, as shown in FIG. 7, at a potential near 0.5 to 1.5 V (vs. Li/Li), a peak of an oxidation current indicating the dissolution of lithium from an alloy of lithium and platinum and the generation of a lithium ion was observed. As shown in FIG. 7, except those, neither a peak of a large reduction current of $-20$ $\mu A/cm^2$ or less nor a peak of a large oxidation current of 20 $\mu A/cm^2$ or more was observed. The reduction and oxidation potential windows were 0.059 V (vs. $Li/Li^+$) and 5.5 V (vs. $Li/Li^+$) or higher, respectively. A reduction potential window of 0.059 V (vs. $Li/Li^+$) was a sufficiently low potential to charge graphite.

The composition of the solid electrolyte of Example 37 is $Li_2ZrCO_3Cl_4$. As shown in FIG. 8, in the cyclic voltammogram of the solid electrolyte of Example 37 which is a case where a platinum foil was used as the working electrode, at a potential near 0 V (vs. Li/Li), a peak of a reduction current indicating an alloying reaction of a lithium ion with platinum was observed. In addition, as shown in FIG. 8, at a potential near 0.5 to 1.5 V (vs. Li/Li), a peak of an oxidation current indicating the dissolution of lithium from an alloy of lithium and platinum and the generation of a lithium ion was observed. As shown in FIG. 8, except those, neither a peak of a large reduction current of $-20$ $\mu A/cm^2$ or less nor a peak of a large oxidation current of 20 $\mu A/cm^2$ or more was observed. The reduction and oxidation potential windows were 0.260 V (vs. $Li/Li^+$) and 5.5 V (vs. $Li/Li^+$) or higher, respectively. A reduction potential window of 0.260 V (vs. $Li/Li^+$) was a potential low enough to charge graphite.

The composition of the solid electrolyte of Example 71 is $Li_2Zr((COO)_2)_{0.5}Cl_5$. As shown in FIG. 9, in the cyclic voltammogram of the solid electrolyte of Example 71 which is a case where a platinum foil was used as the working electrode, at a potential near 0 V (vs. Li/Li), a peak of a reduction current indicating an alloying reaction of a lithium ion with platinum was observed. In addition, as shown in FIG. 9, at a potential near 0.5 to 1.5 V (vs. Li/Li), a peak of an oxidation current indicating the dissolution of lithium from an alloy of lithium and platinum and the generation of a lithium ion was observed. As shown in FIG. 9, except those, neither a peak of a large reduction current of $-20$ $\mu A/cm^2$ or less nor a peak of a large oxidation current of 20 $\mu A/cm^2$ or more was observed. The reduction and oxidation potential windows were 0.033 V (vs. $Li/Li^+$) and 5.5 V (vs. $Li/Li^+$) or higher, respectively. A reduction potential window of 0.033 V (vs. $Li/Li^+$) was a sufficiently low potential to charge graphite.

The composition of the solid electrolyte of Comparative Example 1 is $Li_2ZrCl_6$. As shown in FIG. 10, in the cyclic voltammogram of the solid electrolyte of Comparative Example 1 which is a case where a platinum foil was used as the working electrode, at near approximately 1.05 V (vs. $Li/Li^+$), a peak of a large reduction current was observed. This can be considered that the solid electrolyte itself was reduced. In addition, even at approximately 0.63 V (vs. Li/Li) or lower, a large reduction current was observed. The reduction and oxidation potential windows were 0.433 V (vs. $Li/Li^+$) and 5.5 V (vs. $Li/Li^+$) or higher, respectively. A reduction potential window of 0.433 V (vs. $Li/Li^+$) was a high potential to charge graphite.

As shown in the cyclic voltammograms of FIG. 4 to FIG. 9, in the solid electrolyte of Example 2 (FIG. 4 and FIG. 5), Example 20 (FIG. 6), Example 29 (FIG. 7), Example 37 (FIG. 8) and Example 71 (FIG. 9), the reduction currents began to flow at lower potentials than in the solid electrolyte of Comparative Example 1 (FIG. 10). From these results, it was possible to confirm that the solid electrolytes of Example 2, Example 20, Example 29, Example 37 and Example 71 were stable at low potentials and had wide reduction potential windows compared with the solid electrolyte of Comparative Example 1.

[Measurement of Ionic Conductivity]

A cell for electrochemical measurement was obtained in the same manner as in the case of measuring the oxidation potential window and the reduction potential window. In addition, the cell for electrochemical measurement was put into a constant-temperature vessel (25° C.) and placed still for 20 minutes under the application of a pressure of approximately 50 $kgf/cm^2$.

After that, the ionic conductivity of the cell for electrochemical measurement was measured. The ionic conductivity of the cell for electrochemical measurement was measured using a potentiostat equipped with a frequency response analyzer by an electrochemical impedance measurement method. The ionic conductivity was measured within a frequency range of 7 MHz to 0.1 Hz under a condition of an amplitude of 10 mV. The results are shown in Table 7 to Table 12.

[Production of Solid Electrolyte Batteries]

Solid electrolyte batteries including a solid electrolyte layer composed of each of the solid electrolytes of Example 1 to Example 100 and Comparative Example 1 were produced by a method to be described below, respectively. The solid electrolyte batteries were produced in a glove box in which an argon atmosphere having a dew point of −70° C. or lower was formed. In addition, charge and discharge tests of the solid electrolyte batteries were performed by a method to be described below, and discharge capacities were measured.

First, lithium cobalt oxide ($LiCoO_2$), each of the solid electrolytes of Example 1 to Example 100 and Comparative Example 1 and carbon black were weighed in proportions of 81:16:3 (parts by weight) and mixed in an agate mortar, thereby producing a positive electrode mixture. Next, graphite, each of the solid electrolytes of Example 1 to Example 100 and Comparative Example 1 and carbon black were weighed in proportions of 67:30:3 (parts by weight) and mixed in an agate mortar, thereby producing a negative electrode mixture.

Lower punches were inserted into resin holders, and the solid electrolytes of Example 1 to Example 100 and Comparative Example 1 (110 mg each) were injected thereinto from above the resin holders. Upper punches were inserted onto the solid electrolytes. The sets were placed in a pressing machine, and the solid electrolytes were pressure-formed at a pressure of 373 MPa. The sets were taken out from the pressing machine, and the upper punches were removed.

The positive electrode mixtures (39 mg) were injected onto the (pellet-shaped) solid electrolytes in the resin holders, the upper punches were inserted onto the positive electrode mixtures, and the sets were placed still in the pressing machine and pressure-formed at a pressure of 373 MPa. Next, the sets were taken out and flipped over, and the lower punches were removed. The negative electrode mixtures (20 mg) were injected onto the solid electrolytes (pellets), the lower punches were inserted onto the negative electrode mixtures, the sets were placed still in the pressing machine and pressure-formed at a pressure of 373 MPa.

Therefore, battery elements in which the positive electrode, the solid electrolyte and the negative electrode were laminated in this order in the resin holder were produced. Screws were threaded into the screw holes on the sides of the upper and lower punches as terminals for charge and discharge.

As a material of exterior bodies that were to seal the battery elements, an aluminum laminate material was prepared. The aluminum laminate material was composed of PET (12), Al (40) and PP (50). PET stands for polyethylene terephthalate, and PP stands for polypropylene. The numerical value in the parenthesis indicates the thickness (the unit is m) of each layer. This aluminum laminate material was cut into the A4 size and folded at the center of the long side such that PP became the inner surface.

As positive electrode terminals, aluminum foils (width: 4 mm, length: 40 mm and thickness: 100 m) were prepared. In addition, as negative electrode terminals, nickel foils (width: 4 mm, length: 40 mm and thickness: 100 m) were prepared. Acid-modified PP was wound around each of these external terminals (the positive electrode terminals and the negative electrode terminals), and the external terminals were thermally attached to the exterior bodies. This is intended to improve the sealing property between the external terminal and the exterior body.

The positive electrode terminal and the negative electrode terminal were installed at approximately the centers of the two facing sides of the folded aluminum laminate material so as to be sandwiched by the aluminum laminate material and were heat-sealed. After that, the set was inserted into the exterior body, and the screws on the sides of the upper punch and the positive electrode terminal in the exterior body were connected together with a lead line to electrically connect the positive electrode and the positive electrode terminal. In addition, the screws on the sides of the lower punch and the negative electrode terminal in the exterior body were connected together with a lead wire to electrically connect the negative electrode and the negative electrode terminal. After that, an opening part of the exterior body was heat-sealed to produce a solid electrolyte battery.

The charge and discharge test of the solid electrolyte battery was performed in a constant-temperature chamber (25° C.). As the notation of the charge and discharge current, C rate was used. nC (mA) indicates a current capable of charging and discharging the nominal capacity (mAh) over 1/n (h). For example, in the case of a battery having a nominal capacity of 70 mAh, a current of 0.05 C is 3.5 mA (calculation formula: 70×0.05=3.5). Similarly, a current of 0.2 C is 14 mA, and a current of 2 C is 140 mA. The solid electrolyte batteries were charged up to 4.2 V at 0.2 C by constant current/constant voltage (referred to as CCCV). The charging was ended when the current became 1/20C. As the discharging, the solid electrolyte batteries were discharged to 3.0 V at 0.2 C. The results are shown in Table 7 to Table 12.

As shown in Table 7 to Table 12, all of the solid electrolyte batteries having a solid electrolyte layer composed of each of the solid electrolytes of Example 1 to Example 100 had a sufficiently large discharge capacity. In contrast, the solid electrolyte batteries having a solid electrolyte layer composed of the solid electrolyte of Comparative Example 1 had a small discharge capacity compared with the solid electrolyte batteries having a solid electrolyte layer composed of each of the solid electrolytes of Example 1 to Example 100.

In addition, as shown in Table 7 to Table 12, all of the solid electrolytes of Example 1 to Example 100 had a wide reduction potential window compared with the solid electrolyte of Comparative Example 1.

REFERENCE SIGNS LIST

1 Positive electrode
1A Positive electrode current collector
1B Positive electrode mixture layer
2 Negative electrode
2A Negative electrode current collector
2B Negative electrode mixture layer
3 Solid electrolyte layer
10 Solid electrolyte battery

The invention claimed is:

1. A solid electrolyte composed of a compound represented by the following formula (1), $$A_aE_bG_cX_d \quad (1)$$

(in the formula (1), A is Li and optionally one or both of Cs and Ca, E is at least one element selected from the group consisting of Al, Sc, Y, Zr, Hf and lanthanoids, G is at least one group selected from the group consisting of OH, $BO_2$, $BO_3$, $BO_4$, $B_3O_6$, $B_4O_7$, $CO_3$, $NO_3$, $AlO_2$, $SiO_3$, $SiO_4$, $Si_2O_7$, $Si_3O_9$, $Si_4O_{11}$, $Si_6O_{18}$, $PO_3$, $PO_4$, $P_2O_7$, $P_3O_{10}$, $SO_3$, $SO_4$, $SO_5$, $S_2O_3$, $S_2O_4$, $S_2O_5$, $S_2O_6$, $S_2O_7$, $S_2O_8$, $BF_4$, $PF_6$, BOB, $(COO)_2$, N, $AlCl_4$, $CF_3SO_3$, $CH_3COO$, $CF_3COO$, OOC—$(CH_2)_2$—COO, OOC—$CH_2$—COO, OOC—CH(OH)—CH(OH)—COO, OOC—CH(OH)—$CH_2$—COO, $C_6H_5SO_3$, OOC—CH═CH—COO, OOC—CH═CH—COO, $C(OH)(CH_2COOH)_2COO$, $AsO_4$, $BiO_4$, $CrO_4$, $MnO_4$, $PtF_6$, $PtCl_6$, $PtBr_6$, $PtI_6$, $SbO_4$, $SeO_4$, $TeO_4$, HCOO and $CH_3COO$, X is at least one element selected from the group consisting of F, Cl, Br and I, $0.5 \le a < 6$, $0.6 < b < 2$, $0.1 < c \le 6$, $1 \le d \le 6.1$, BOB is bisoxalatoborate, OOC—$(CH_2)_2$—COO is succinate, OOC—$CH_2$—COO is malonate, OOC—CH(OH)—CH(OH)—COO is tartrate, OOC—CH(OH)—$CH_2$—COO is malate, $C_6H_5SO_3$ is benzene sulfonate, OOC—CH═CH—COO is fumarate, OOC—CH═CH—COO is maleate and $C(OH)(CH_2COOH)_2COO$ is citrate).

2. A solid electrolyte battery comprising:

a solid electrolyte layer;

a positive electrode; and a negative electrode, wherein at least one selected from the solid electrolyte layer, the positive electrode and the negative electrode contains the solid electrolyte according to claim 1.

* * * * *